(12) United States Patent
Hosono

(10) Patent No.: US 7,509,041 B2
(45) Date of Patent: Mar. 24, 2009

(54) IMAGE-CAPTURING DEVICE HAVING MULTIPLE OPTICAL SYSTEMS

(75) Inventor: Eiji Hosono, Kanagawa (JP)

(73) Assignee: Eastman Kodak Company, Rochester, NY (US)

( * ) Notice: Subject to any disclaimer, the term of this patent is extended or adjusted under 35 U.S.C. 154(b) by 306 days.

(21) Appl. No.: 11/301,409

(22) Filed: Dec. 13, 2005

(65) Prior Publication Data

US 2007/0025713 A1    Feb. 1, 2007

(30) Foreign Application Priority Data

Aug. 1, 2005    (JP)    ............................. 2005-223208

(51) Int. Cl.
*G03B 17/00*    (2006.01)

(52) U.S. Cl. .............................. 396/60; 396/85; 396/322

(58) Field of Classification Search ................... 396/72, 396/85–87, 60, 322; 348/240.99, 240.1–240.3
See application file for complete search history.

(56) References Cited

U.S. PATENT DOCUMENTS

| 7,206,136 B2 * | 4/2007 | Labaziewicz et al. ........ 359/676 |
| 2003/0020814 A1 * | 1/2003 | Ono ........................ 348/220.1 |

FOREIGN PATENT DOCUMENTS

| JP | 10042183 | 2/1998 |
| JP | 20033283910 | 10/2003 |

* cited by examiner

*Primary Examiner*—W. B. Perkey
(74) *Attorney, Agent, or Firm*—Pamela R. Crocker

(57) ABSTRACT

By providing different switching points between two optical systems for the case where an image capture device such as a camera is zoomed in, when the angle of view for the captured image is transitioned from wide to tele, and for the case where the camera is zoomed out, when the angle of view of the captured image is transitioned from tele to wide, the number of switching operations between the two optical systems can be reduced.

11 Claims, 16 Drawing Sheets

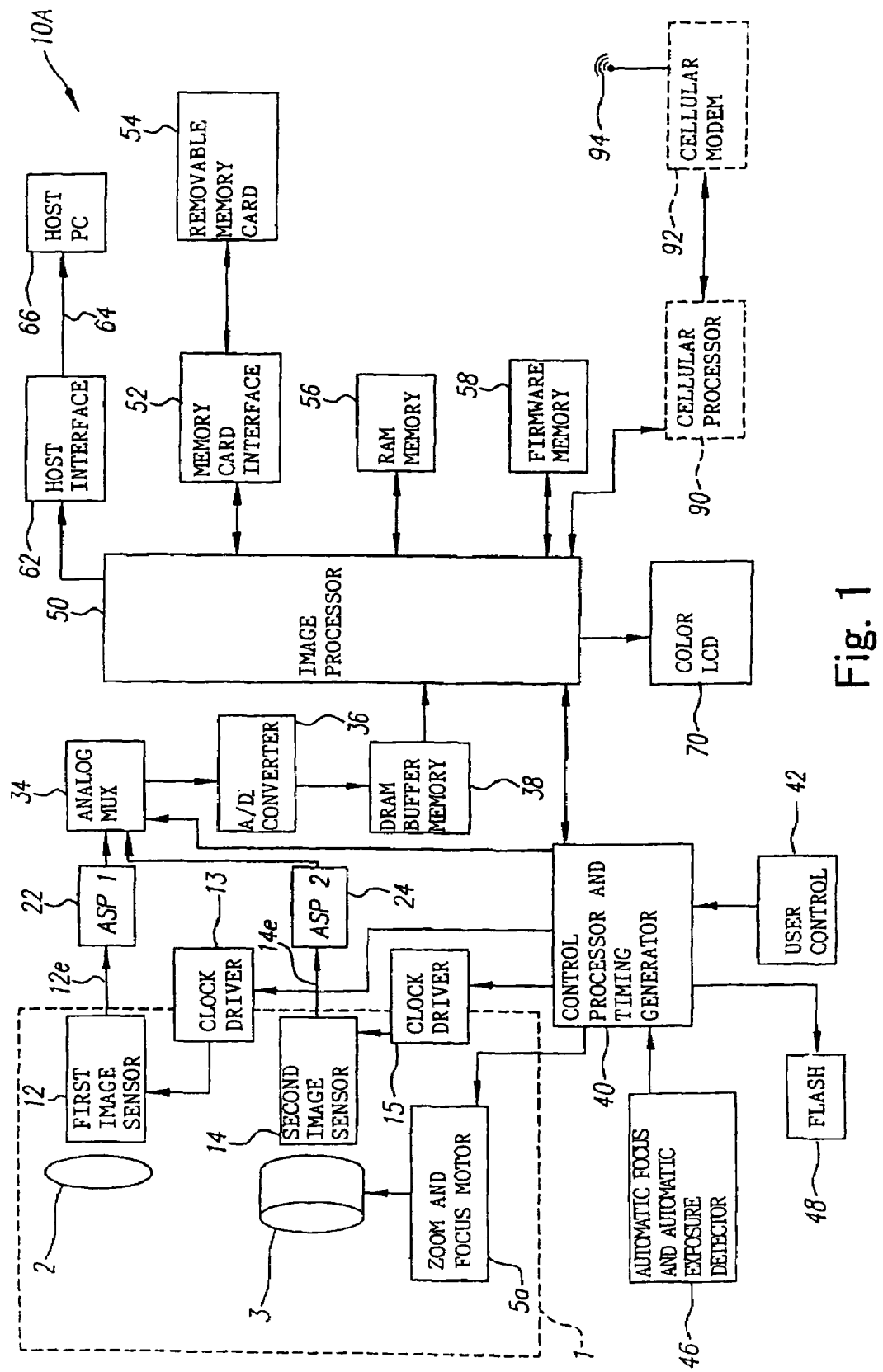

IMAGE-CAPTURING DEVICE HAVING MULTIPLE OPTICAL SYSTEMS

FIELD OF THE INVENTION

The present invention relates to an image-capturing device such as a digital camera and, more particularly, to an image-capturing device having multiple optical systems for capturing an image of a scene.

BACKGROUND OF THE INVENTION

Currently, many digital cameras have a zoom lens, and a single image sensor for capturing still and motion images. The captured images are then digitally processed to produce digital image files, which are stored in a digital memory in the camera. The digital image files can then be transferred to a computer and displayed, or transferred to a printer and printed.

Small camera size and large optical zoom range are very important features of digital cameras. Users prefer to have a large zoom range rather than a limited zoom range. Unfortunately, providing a large zoom range lens, without sacrificing the quality of the captured images, increases the size of the digital camera. With higher cost cameras, such as single-lens reflex cameras, these problems are sometimes addressed by using multiple, interchangeable zoom lenses, such as a 28-70 mm zoom and a 70-210 mm zoom. Such an option, however, is inconvenient for a user of a compact digital camera.

Some digital cameras use a single lens and multiple image sensors to form a color image. Light from a target is separated into multiple colors by a prism beam splitter, and multiple monochrome image sensors are used to capture red, green, and blue color images.

Stereo film cameras and stereo digital cameras are known in the related art. These cameras have two horizontally-separated lenses of the same focal length, which form slightly different images of the scene onto two frames of film or two image sensors. The two images provide a so-called "stereo pair." The two lenses are designed to provide the same magnification, and both are used to simultaneously capture left-eye and right-eye images on a pair of image sensors in order to achieve a stereo effect.

In a compact digital camera, in order to obtain a large zoom range without incurring the cost of lens exchange, the digital camera is preferably equipped with multiple lenses having different focal lengths, and the multiple lenses are used distinctively according to a zoom position. When, for example, two lenses having different focal lengths are equipped on a camera, how the focal lengths are set is important, as is how the two lenses are switched, because a digital camera offers an electronic zoom function for electronically zooming digital image data in addition to the optical zoom function.

Japanese Patent Laid-Open Publication No. Hei 10-42183 discloses a camera having one lens and one image sensor in which an angle of view is determined by driving an electronic zoom and an optical zoom, and a percentage of the optical zoom is increased while the angle of view is maintained.

Japanese Patent Laid-Open Publication No. 2003-283910 discloses a camera having an optical finder and a zoom finder wherein the finders are suitably switched and, when the finder is switched from the electronic finder to the optical finder, the lens of the optical finder system is driven in connection with an image-capturing lens so that the angles of view match.

The above-described related art references relate to a camera having one lens and one image sensor and do not relate to a camera system having multiple optical systems for capturing images of a scene. Thus, none of these references disclose how the optical system is switched among the multiple optical systems.

Consider a digital camera having two lenses including a fixed focal length lens and a zoom lens. Switching of these two lenses is performed as follows. A focal length gap between the focal length of the fixed focal length lens and a minimum focal length of the zoom lens is interpolated by an electronic zoom of a digital image obtained by the fixed focal length lens. The camera is provided with a zoom-setting unit (zoom button) for setting a zoom position, and the user can set the zoom setting unit to the wide side (wider angle) or to the tele side (narrower angle) so that the user can capture images at a desired zoom position. When the user sets the zoom-setting unit provided on the camera to "tele," the digital image obtained by the fixed focal length lens is electronically zoomed in, the lens is switched to the zoom lens when a tele end of the electric zoom is reached, and the optical zoom is performed using the zoom lens. When, on the other hand, the user operates the zoom setting unit to set the zoom setting unit to "wide," a digital image is obtained by optical zoom-out, the lens is switched to the electronic zoom of the fixed focal length lens when the minimum focal length of the zoom lens is reached, and the camera is zoomed out using the fixed focal length lens.

FIG. 15 schematically shows an electronic zoom range and an optical zoom range of a digital camera having a fixed focal length lens corresponding to 20 mm in a 35-mm film camera and a zoom lens corresponding to 40 mm-120 mm in a 35-mm film camera. In this structure, there is a focal length gap in 20 mm-40 mm between the 20 mm fixed focal length lens and the 40 mm-120 mm zoom lens. An electronic zoom range 700 of the 20 mm fixed focal length lens is set so as to fill in the focal length gap. The focal length of the wide end (an end near the wide angle) of the electronic zoom range 700 of the 20 mm fixed focal length lens is represented as $I_{DW}$ (20 mm) and a focal length of the tele end (an end near the tele side) is represented as $I_{DT}$ (40 mm). A focal length of the wide end of an optical zoom range 800 of the zoom lens is represented as $II_{OW}$ (40 mm) and a focal length at the tele end is represented as $II_{OT}$ (120 mm). In general, because the electronic zoom zooms in by interpolating the original digital image, the electronic zoom causes degradation in image quality. Therefore, as is easily seen, the lens should be switched to the zoom lens within the optical zoom range of the zoom lens. Therefore, when the user operates the zoom setting unit towards "tele," the lens is switched from the fixed focal length lens to the zoom lens to transition to the optical zoom range 800 when the tele end $I_{DT}$ of the electronic zoom range 700 is reached. When, on the other hand, the user operates the zoom setting unit to "wide," the lens is switched from the zoom lens to the fixed focal length lens to transition to the electrical zoom range 700 when the wide end $II_{OW}$ of the optical zoom range 800 is reached.

FIG. 16 shows zoom ranges in a case (A) in which the user sets the zoom setting unit to "wide" so that the captured image is transitioned from tele to wide and those in a case (B) in which the user sets the zoom setting unit to "tele" to transition the captured image from wide to tele. In FIG. 16(A), in the electronic zoom range 700, electronic zoom-out of the digital image obtained by the fixed focal length lens is performed according to the "wide" operation of the zoom setting unit by the user. In the optical zoom range 800, on the other hand, optical zoom-out of the digital image obtained by the zoom lens is performed. When the zoom position of the zoom lens reaches the minimum focal length $II_{OW}$ of the zoom lens; that is, the wide end of the optical zoom range 800 during execution of the optical zoom-out process, the optical system capturing an image of the scene is switched from the zoom lens to the fixed focal length lens. In FIG. 16(B), in the electronic zoom range 700, an electronic zoom-in process of the digital image obtained by the fixed focal length lens is performed. In the optical zoom range 800, an optical zoom-in process of the digital image obtained by the zoom lens is performed. When the tele end $I_{DT}$ of the electronic zoom range is reached during execution of the electronic zoom-in process, the optical system capturing an image of the scene is switched from the fixed focal length lens to the zoom lens.

In the above-described structure in which a tele end of the electronic zoom of the fixed focal length lens and the wide end of the optical zoom of the zoom lens are matched and the lens is switched at this focal length, there arises a problem in that switching of the lenses frequently occurs around the focal length of 40 mm; for example, around a position 900 in FIG. 16. The zoomed image in which the digital image obtained by the fixed focal length lens is electronically zoomed and the zoomed image in which the digital image is optically zoomed by the zoom lens differ in image quality even when the angle of view is identical. Therefore, when switching of lenses occurs frequently, the user would see switching between images having different image qualities even though the angle of view is identical, which is inconvenient.

SUMMARY OF THE INVENTION

The present invention advantageously provides an image-capturing device which uses multiple optical systems in which the number of switching operations between optical systems during zoom-in and zoom-out is reduced to thereby improve visibility and operation for the user.

According to one aspect of the present invention, there is provided an image-capturing device comprising an image-capturing optical system having a first image-capturing optical system which is of a zoom type and a second image-capturing optical system which is of a zoom type, wherein an angle of view at a wide end of a zoom range of the first image-capturing optical system is set to be wider than an angle of view at a wide end of a zoom range of the second image-capturing optical system and the zoom ranges are set so that the zoom range of the first image-capturing optical system and the zoom range of the second image-capturing optical system partially overlap; a user setting unit which sets the angle of view for image capturing to an angle of view desired by a user; and a controller which applies a control to switch to the second image-capturing optical system at a tele end or a position near the tele end of the first image-capturing optical system when the first image-capturing optical system is used to zoom in and to switch to the first image-capturing optical system at a wide end or a position near the wide end of the second image-capturing optical system when the second image-capturing optical system is used to zoom out.

According to the present invention, by providing different switching points between the two optical systems for the case where the camera is zoomed in (that is, when the angle of view for the captured image is transitioned from wide to tele) and for the case where the camera is zoomed out (that is, when the angle of view of the captured image is transitioned from tele to wide), the number of switching operations between the two optical systems can be reduced.

BRIEF DESCRIPTION OF THE DRAWINGS

A preferred embodiment of the present invention will be described in detail by reference to the drawings, wherein:

FIG. 1 is a block diagram showing the structure of a digital camera;

DETAILED DESCRIPTION OF THE INVENTION

Figure 2A:
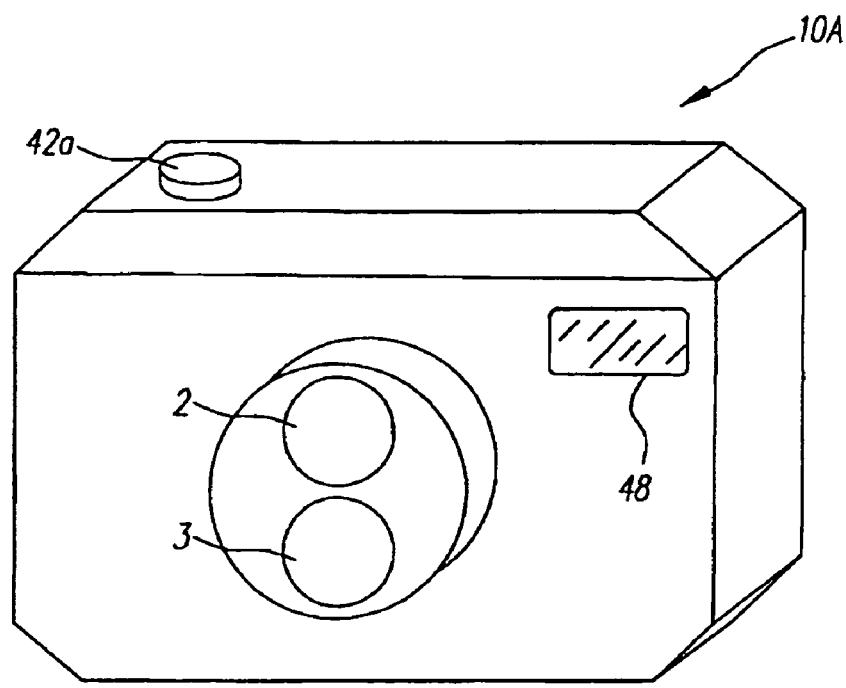
FIG. 2A is a perspective view showing a digital camera as seen from the front.

A preferred embodiment of the present invention will now be described by reference to the drawings.

FIG. 1 is a block diagram showing the structure of a digital camera 10A according to a preferred embodiment of the present invention. The digital camera 10A is a portable camera which is driven by a battery. The digital camera 10A produces a still digital image which is stored in a removable memory card 54. The digital camera 10A may produce a motion digital image in addition to or in place of the still image. The motion digital image is similarly stored in the memory card 54.

The digital camera 10A comprises an image-capturing assembly 1 which includes a fixed focal length lens 2 which forms an image of a scene on a first image sensor 12 and a zoom lens 3 which forms an image of the scene on a second image sensor 14. The image-capturing assembly 1 provides a first image output 12e from the first image sensor 12 and a second image output 14e from the second image sensor 14. The image sensors 12 and 14 are image sensors having the same aspect ratio and the same pixel size, and the lens 2 is an ultra-wide-angle lens corresponding to a 35 mm film equivalent focal length of 22 mm (written as 22 mm equiv., where 22 mm is the focal length of a 35 mm film camera that provides the same field of view as the fixed focal length lens 2 provides to the image sensor 12) and the zoom lens 3 is a zoom lens of 40 mm-120 mm equivalent.

A focal length (f.l.) of 35 mm film equivalent (35 mm film equivalent) can be calculated by the following formula: 35 mm film equivalent focal length=(actual focal length (mm) *43.27 mm)/(length of diagonal of image screen (mm)).

The focal length of the fixed lens 2 provides an ultra-wide field of view of 22 mm equivalent, and the fixed lens 2 focuses on targets from 4 feet to infinity. Therefore, the fixed lens 2 does not need focus adjustment. The fixed focal length lens 2 has a diaphragm and a shutter assembly for controlling exposure of the image sensor 12. The zoom lens 3 is driven by a zoom and focus motor 5a and comprises a diaphragm and a shutter assembly for controlling exposure of the image sensor 14.

The image sensors 12 and 14 are single-chip color mega pixel CCD sensors and use well-known Bayer color filters for capturing color images. The image sensors 12 and 14 have a 4:3 image aspect ratio, 3.1 effective mega pixels, and 2048 pixels×1536 pixels.

A control processor and timing generator 40 controls the first image sensor 12 by supplying a signal to a clock driver 13 and controls the second image sensor 14 by supplying a signal to a clock driver 15. The control processor and timing generator 40 also controls the zoom and focus motor 5a and a flash 48 for irradiating a scene. The control processor and timing generator 40 receives a signal from an automatic focus and automatic exposure detector 46. Alternatively, the image sensor 14 may be used for exposure detection and TTL automatic focusing in place of the automatic focus and automatic exposure detector 46. A user control 42 is used for controlling operations of the digital camera 10A.

The output signal 12e from the first image sensor 12, which is an analog signal, is amplified by a first analog signal processor (ASP1) 22 and is supplied to a first input of a control element 34; that is, an analog multiplexer control element. The output signal 14e from the second image sensor 14, which is a second analog signal, is amplified by a second analog signal processor (ASP2) 24 and is supplied to a second input of the control element 34. A function of the control element 34 is to select one of the first sensor output 12e from the first image sensor 12 and the second sensor output 14e from the second image sensor 14 and to supply the selected sensor output from the image-capturing assembly 1 to subsequent components.

The control processor and timing generator 40 controls the analog multiplexer control element 34 in order to supply an output of the first analog signal processor (ASP1) 22 or that of the second analog signal processor (ASP2) 24 to an analog-to-digital (A/D) converter circuit 36. The digital data supplied from the A/D converter 36 is stored in a DRAM buffer memory 38 and is processed by an image processor 50. The process executed by the image processor 50 is controlled by firmware stored in a ??firmware??!! FIG. 1 uses the name "fire wire." I believe that "firmware" is correct!! memory 58 comprising a flash EPROM memory. The processor 50 processes an input digital image file, and the input digital image file is stored in a RAM memory 56 during processing stages.

Alternatively, there may be employed a configuration in which two A/D converter circuits are respectively connected to the outputs of the first analog signal processor (ASP1) 22 and the second analog signal processor (ASP2) 24. In this case, the analog MUX 34 is not necessary and a digital multiplexer is used to select one of the outputs of the A/D converter circuits.

The digital image file processed by the image processor 50 is supplied to a memory card interface 52 which stores the digital image file into the removable memory card 54. The memory card 54 is one type of a digital image storage medium and may be used in a number of different physical formats. For example, the memory card 54 may be applied to a known format such as, for example, Compact Flash (registered trademark), smart media, memory stick, MMC, SD, and XD memory card formats. Other formats such as a magnetic hard drive, a magnetic tape, and an optical disk may be used. Alternatively, the digital camera 10A may use an internal non-volatile memory such as a flash EPROM. In such a case, the memory card interface 52 and the memory card 54 are not necessary.

The image processor 50 executes various housekeeping and image processing functions including color interpolation by color and tone correction for producing sRGB image data. The sRGB image data is then compressed in JPEG format and is stored in the memory card 54 as JPEG image data. The sRGB image data is also supplied to a host PC 66 via a host interface 62 such as SCSI connection, USB connection, and FireWire connection. The JPEG file uses the so-called "Exif" image format.

The image processor 50 is typically a programmable image processor and may be a hardwired, customized integrated circuit processor, a general-purpose microprocessor, or a combination of the hardwired, customized IC processor and the programmable processor.

The image processor 50 also produces a low-resolution thumbnail image. After an image is captured, the thumbnail image is displayed on a color LCD 70. A graphical user interface displayed on the color LCD 70 is controlled by the user control 42.

The digital camera 10A may be part of a camera phone. In such an embodiment, the image processor 50 is connected to a cellular processor 90 which uses a cellular modem 92 in order to transmit the digital image to a cellular network by means of wireless transmission via an antenna 94. The image-capturing assembly 1 may be an integrated assembly including the lenses 2 and 3, the image sensors 12 and 14, and the zoom and focus motor 5a. In addition, the integrated assembly may include the clock drivers 13 and 15, the analog signal processors 22 and 24, the analog multiplexer MUX 34, and the A/D converter 36.

Figure 2B:
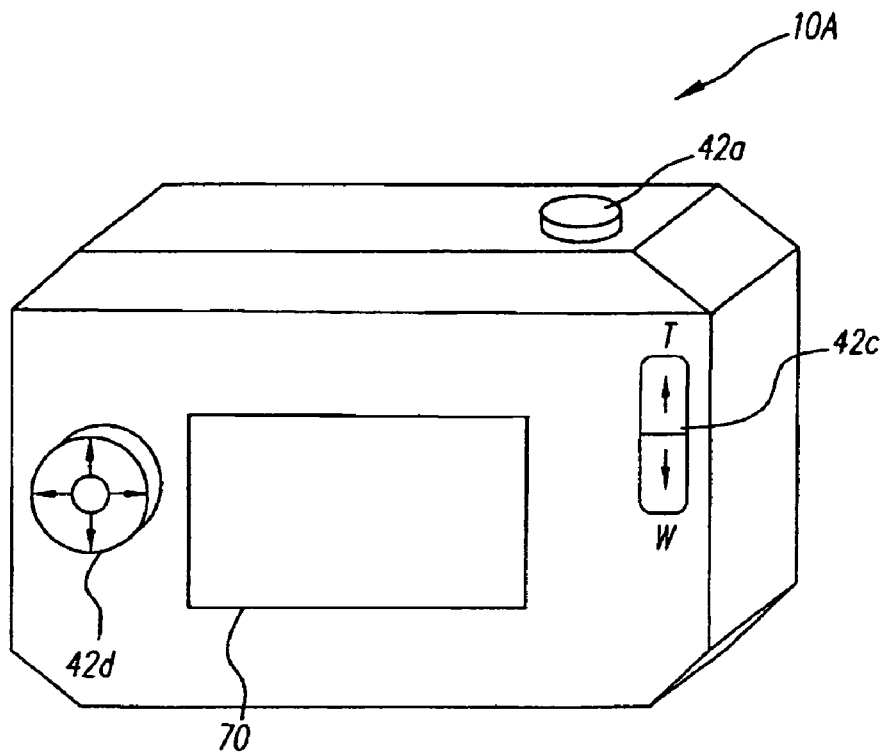
FIG. 2B is a perspective view showing a digital camera as seen from the back.
Figure 6A:
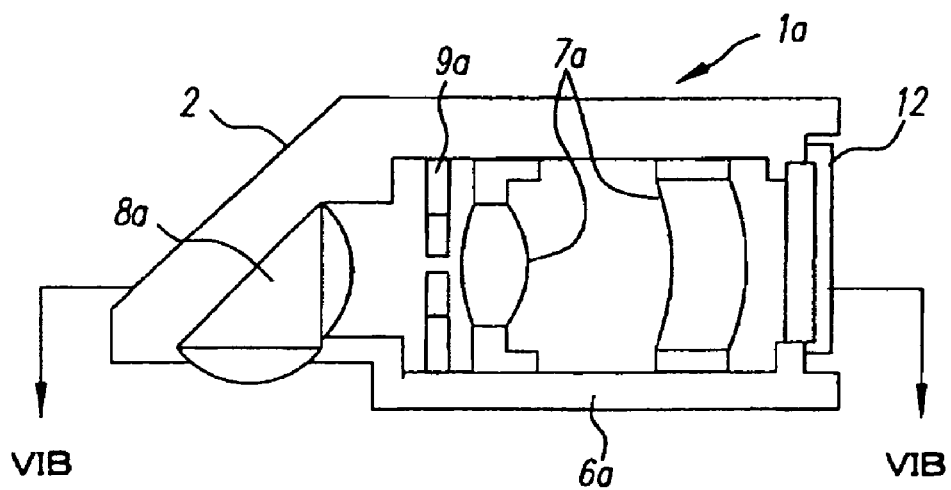
FIG. 6A is a plan sectional view showing a bent optical system having a fixed focal length lens.
Figure 6B:
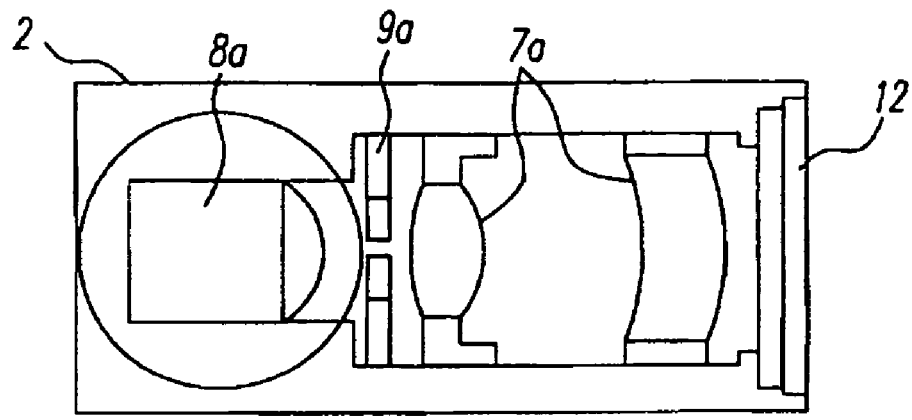
FIG. 6B is a front sectional view showing a bent optical system having a fixed focal length lens.

FIGS. 2A and 2B are perspective views of the digital camera 10A. FIG. 2A is a front view of the digital camera 10A and shows the fixed focal length lens 2, the zoom lens 3, and the flash 48. The fixed focal length lens 2 is an ultra-wide angle lens and has a 22 mm equivalent focal length and an f/2 maximum aperture. The zoom lens 3 is an ultra-thin lens; that is, a prism lens, and is a 40mm-120 mm equivalent zoom lens. The prism lens has a lens structure as shown in FIGS. 6A and 6B and has a prism 8a for bent optical path to achieve a very thin optical structure. FIG. 2B is a view of the digital camera 10A as seen from the back and shows the color LCD 70 and multiple user controls 42. The user controls 42 include a shutter button 42a which allows an image capturing sequence, a zoom button (button for setting the angle of view of image capturing at a desired angle of view) 42c which allows a zoom setting, and a multi-position selector 42d for performing operations via the image and menu selection displayed on the color LCD 70.

An aspect ratio of an image obtained by the fixed focal length lens 2 and the image sensor 12 may differ from an aspect ratio of an image obtained by the zoom lens 3 and the image sensor 14. For example, the image sensor 12 may have an aspect ratio of 16:9 with 2730 pixels×1530 pixels and 4.2 effective mega pixels. The LCD 70 may have a wide aspect ratio (for example, 16:9).

Figure 3:
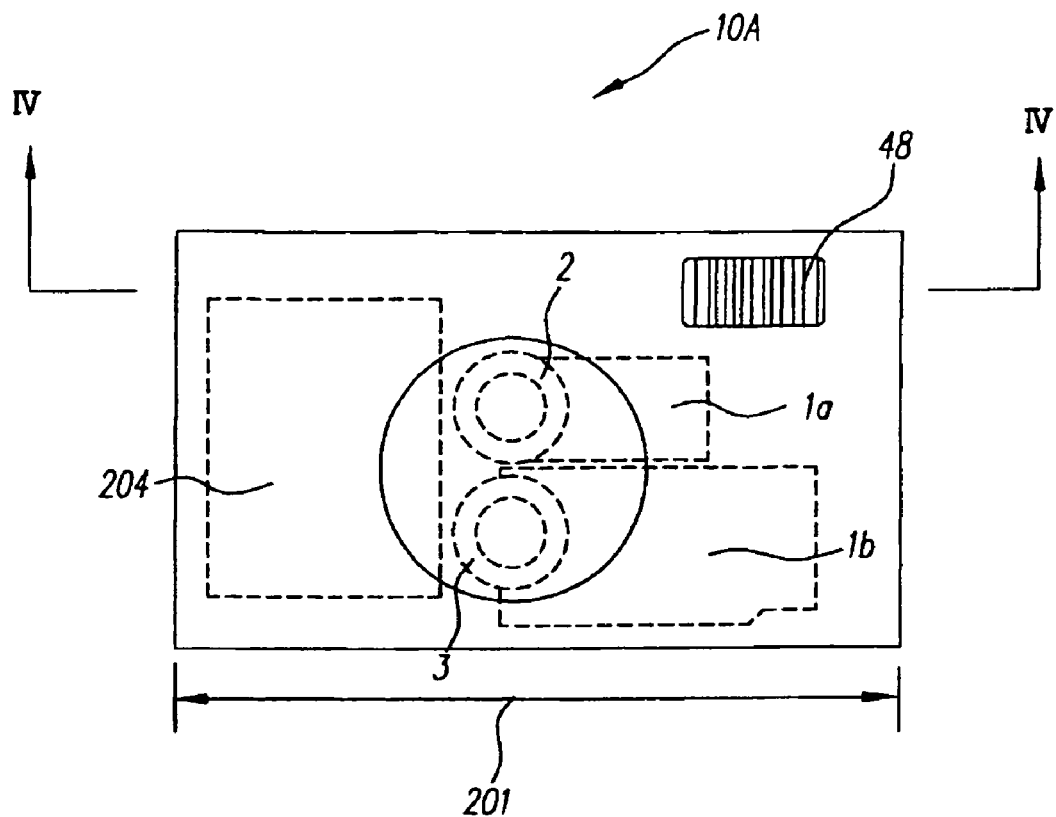
FIG. 3 is a front view of a digital camera.
Figure 4:
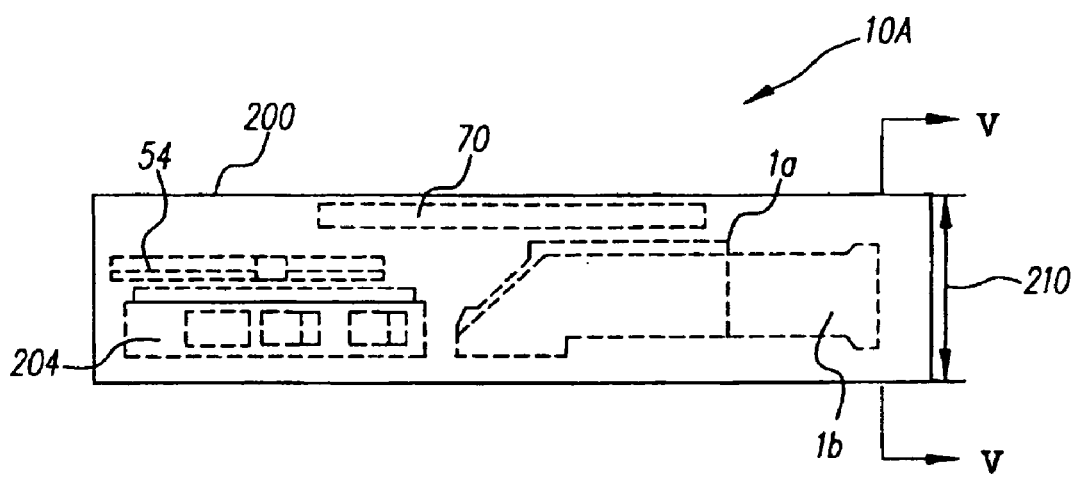
FIG. 4 is a plan sectional view of a digital camera.
Figure 5:
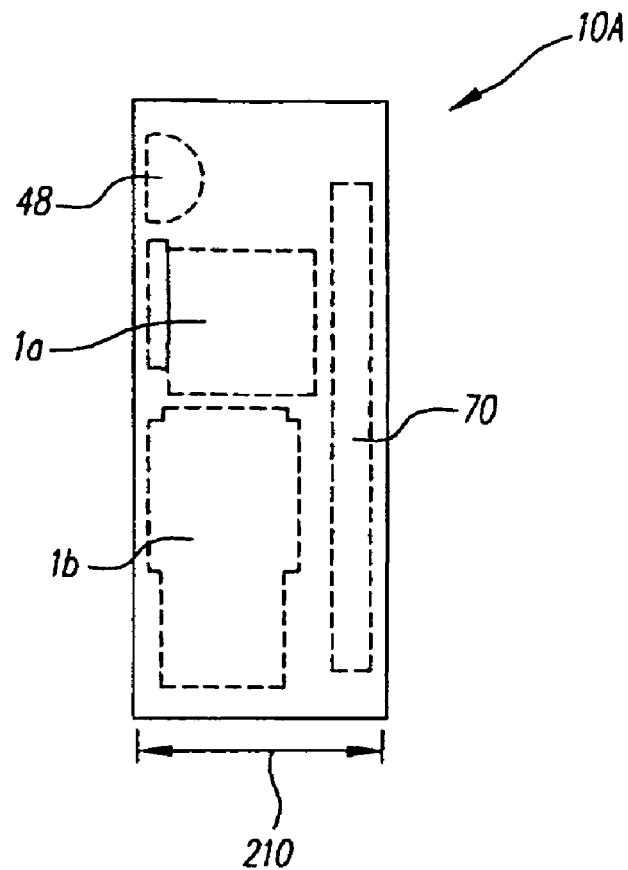
FIG. 5 is a side sectional view of a digital camera.

FIGS. 3, 4, and 5 show internal placement of the digital camera 10A. FIG. 3 is a front view of the digital camera 10A and shows how a fixed focal length lens subassembly 1a and a zoom lens subassembly 1b are positioned at one side of the lenses 2 and 3 and below the electronic flash 48. A battery 204 is positioned on the other side of the lenses 2 and 3. FIG. 4 is a plan sectional view of the digital camera 10A as seen from line IV-IV of FIG. 3 and further shows the memory card 54 and the color LCD 70. FIG. 5 is a side sectional view of the digital camera 10A as seen from line V-V in FIG. 4 and further shows positions along the vertical direction of the fixed focal length lens subassembly 1a, the zoom lens subassembly 1b, and the flash 48. Of a particular interest is that the image-capturing assembly 1 can be stored in a compact size 210 from the front to the rear of the camera 10A by virtue of the bent optical system of the subassemblies 1a and 1b.

FIGS. 6A and 6B show an optical relay subassembly 1a which supports the fixed focal length lens 2 with respect to the image sensor 12 along the bent optical path. FIG. 6A shows a lens tube 6a which supports a relay lens component 7a on an optical path which is bent by an objective lens of the fixed focal length lens 2, the image sensor 12, and the mirror prism 8a. In addition, the lens tube 6a supports an aperture shutter assembly 9a on the optical path. FIG. 6B is a view seen from line VIB-VIB of FIG. 6A and shows an exterior of the optical subassembly 1a as seen from the front of the camera.

Figure 7:
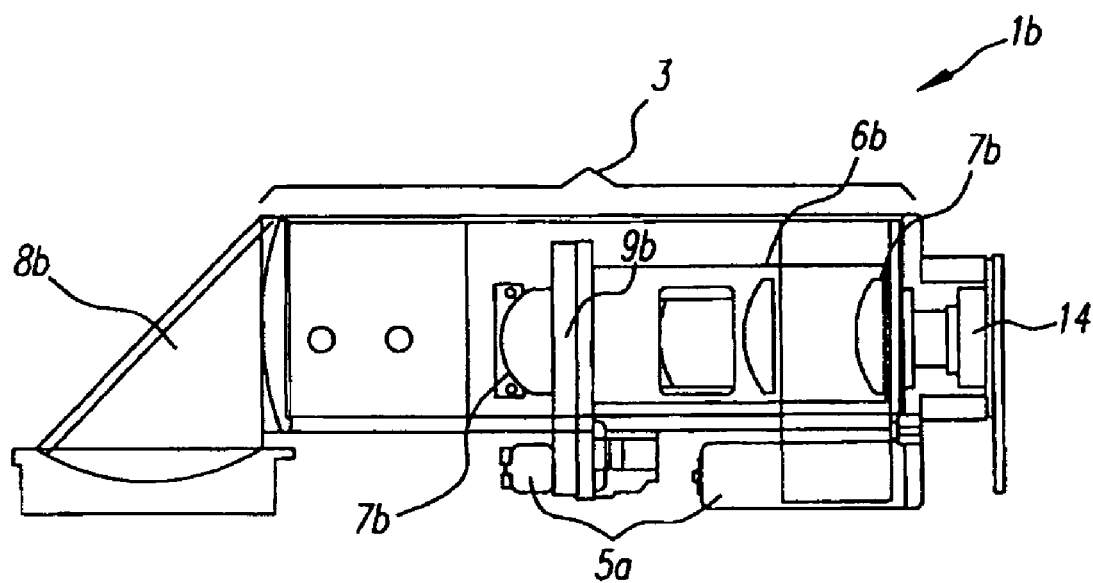
FIG. 7 is a plan sectional view showing a bent optical system having a zoom lens.

FIG. 7 shows an optical relay subassembly?? 1b which supports the zoom lens 3 with respect to the image sensor 14 along the bent optical path. The subassembly 1b comprises a fixture 6b which supports a relay (zoom) lens component 7b which can move on the optical path bent by the objective lens of the zoom lens 3, the second image sensor 14, and a mirror prism 8b. The fixture 6b supports an aperture shutter assembly 9b on the optical path. The movement of the lens component 7b is controlled by the zoom and focus motor 5a.

The basic operation of this structure is as follows. When the digital camera 10A is switched on by means of a power switch, the zoom lens 3 is set at a default position which is preferably at a wide end; that is, the minimum focal length $II_{OW}$ of the zoom lens 3. The control processor and timing generator 40 controls the analog multiplexer 34 and uses the analog signal processor (ASP1) 22 so that an output from the first image sensor 12 is supplied to the A/D converter 36. A preview image from the image sensor 12 is displayed on the LCD 70. When the zoom button is operated, an electronic zoom process is executed by the fixed focal length lens (wide angle lens) 2. Then, when the shutter button 42a is pressed, a still image is captured by means of the output of the first sensor 12. When the user continues to operate on the "tele" side of the zoom button 42c, switching between two optical systems occurs. In the present embodiment, the electronic zoom range 700 of the fixed focal length lens 2 and the optical zoom range 800 of the zoom lens 3 are set so that portions of the ranges overlap each other. In addition, in the present embodiment, the switching points between two lenses are varied for a case when the angle of view of the captured image is transitioned from wide to tele and a case when the angle of view is transitioned from tele to wide. This characteristic of the switching points can alternatively be described as imparting a hysteresis characteristic to the switching process between two lenses.

Figure 8:
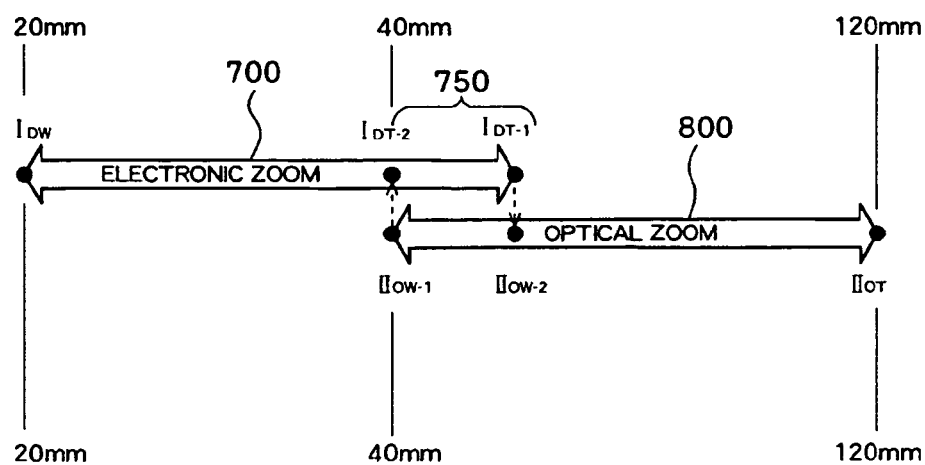
FIG. 8 is a diagram showing a relationship between an electronic zoom range of a fixed focal length lens and an optical zoom range of a zoom lens according to a preferred embodiment of the present invention.
Figure 15:
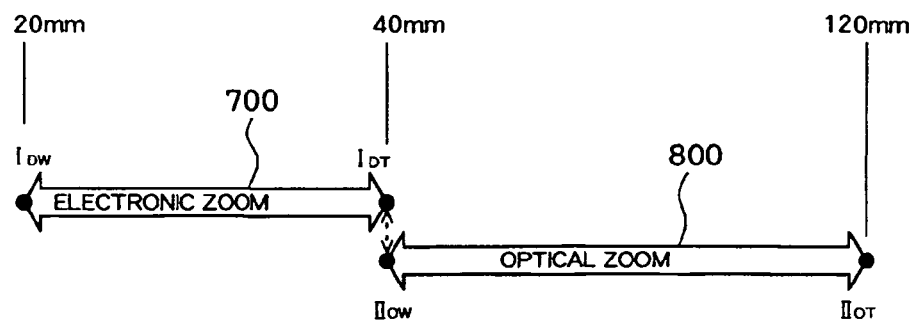
FIG. 15 is a diagram showing a relationship between an electronic zoom range and an optical zoom range.
Figure 16:
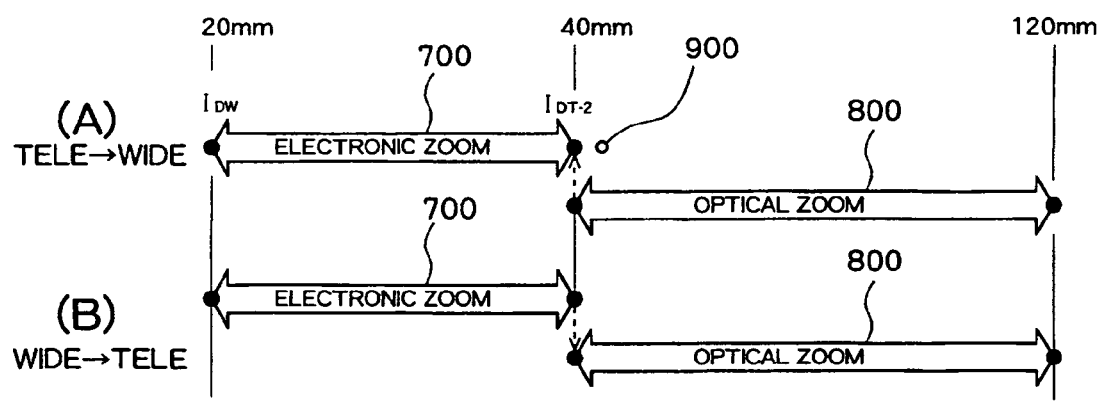
FIG. 16 is a diagram showing a switching point in FIG. 15.

FIG. 8 shows the electronic zoom range 700 of the fixed focal length lens 2 and the optical zoom range 800 of the zoom lens 3 in the present embodiment. A characteristic of the present embodiment should be clear from comparison between FIGS. 8 and 15. The electronic zoom range 700 of the fixed focal length lens 2 not only fills the focal length gap between the fixed focal length lens 2 and the zoom lens 3, but also overlaps a portion of the zoom range 800 of the zoom lens 3 to form an overlap range 750. When the wide end of the electronic zoom range 700 of the fixed focal length lens 2 is represented as $I_{DT}$, the tele end of the electronic zoom range 700 is represented as $I_{DT-1}$, the wide end of the optical zoom range 800 of the zoom lens 3 is represented as $II_{OW-1}$, and the tele end of the optical zoom range 800 is represented as $II_{OT}$, $I_{DW}$ is positioned at a position nearer to the wide side than is $II_{OW-1}$, and $I_{DT-1}$ is positioned at a position nearer to the wide side than is $II_{OT}$ and nearer to the tele side than is $II_{OW-1}$. Because the zoom range 800 of the zoom lens 3 is 40 mm-120 mm, the electronic zoom range 700 of the fixed focal length lens 2 in FIG. 8 extends further towards the tele side than does the optical zoom range 800 in FIG. 15.

The switching between the fixed focal length lens 2 and the zoom lens 3 is executed as follows. A digital image from the first image sensor 12 formed by the fixed focal length lens 2 is obtained. Then, if the user continues to operate the "tele" side of the zoom button 42c, the digital image from the first image sensor 12 is electronically zoomed in and displayed on the LCD 70. When the focal length of the electronic zoom-in reaches the tele end $I_{DT-1}$ of the electronic zoom range 700, the control processor and timing generator 40 switches from the fixed focal length lens 2 to the zoom lens 3. During the switching process, the zoom position of the zoom lens 3 is set at $II_{OW-2}$ corresponding to $I_{DT-1}$, In other words, the zoom position of the zoom lens 3 is driven in connection with the electronic zoom of the fixed focal length lens 2 in the overlap range 750 and, when the zoom position of the electronic zoom reaches the tele end $I_{DT-1}$, the zoom position of the zoom lens 3 is driven to the zoom position $II_{OW-2}$ corresponding to the tele end $I_{DT-1}$ of the electronic zoom. In this manner, the zoom lens 3 attains a stand-by state for switching, and a change in the angle of view of the captured image due to switching is prevented.

When, on the other hand, the user obtains a digital image from the second image sensor 14 formed by the zoom lens 3 and continues to operate on the "wide" side of the zoom button 42c, the digital image from the second image sensor 14 is optically zoomed out and displayed on the LCD 70. When the focal length of the optical zoom-out reaches the wide end $II_{OW-1}$ of the optical zoom range 800, the control processor and timing generator 40 switches from the zoom lens 3 to the fixed focal length lens 2. During the switching process, the electronic zoom position of the fixed focal length lens 2 is set at $I_{DT-2}$ corresponding to $II_{OW-1}$. In other words, the zoom position of the electronic zoom is set in connection with the optical zoom of the zoom lens 3 in the overlap range 750. In this manner, the electronic zoom of the fixed focal length lens 2 attains a stand-by state for switching, and a change in the angle of view of the captured image due to switching is prevented.

It should be noted that, in the present embodiment, although the switching point between the two lenses when the captured image is transitioned from wide to tele is $I_{DT-1}$, the switching point between the two lenses when the captured image is transitioned from tele to wide is not $II_{OW-2}$ which corresponds to $I_{DT-1}$, but is $II_{OW-1}$. In other words, the switching point between the two lenses when the captured image is transitioned from wide to tele is not identical to and differs from the switching point between the two lenses when the captured image is transitioned from tele to wide.

Figure 9:
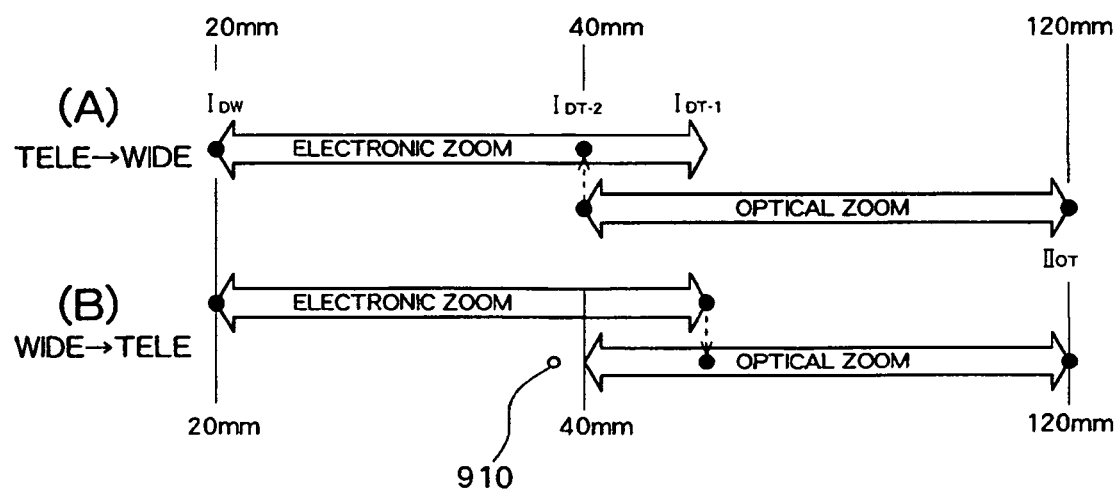
FIG. 9 is a diagram showing a switching point of a lens of FIG. 8.

FIG. 9 shows switching points employed when the captured image is transitioned from tele to wide (A) and when the captured image is transitioned from wide to tele (B). As shown in FIG. 9(A), when the user continues to operate on the "wide" side of the zoom button 42c, the lens is switched from the zoom lens 3 to the fixed focal length lens 2 at a minimum focal length of the zoom lens 3; that is, the wide end of the optical zoom. The digital image obtained by the first image sensor 12 is electronically zoomed and the zoom position is set to be equal to the zoom position of the zoom lens 3. In this manner, the user can see an image of the same angle of view on the LCD 70 despite the switching of the two lenses. On the other hand, as shown in FIG. 9(B), when the user continues to operate the "tele" side of the zoom button 42c, the lens is switched from the fixed focal length lens 2 to the zoom lens 3 at the tele end of the electronic zoom. The zoom position of the zoom lens 3 changes in connection with the zoom position of the electronic zoom prior to the lens switching and is set to the zoom position corresponding to the tele end of the electronic zoom when the electronic zoom reaches the tele end. The driving of the zoom lens 3 in connection with the electronic zoom is controlled by the control processor and timing generator 40. The image processor 50 supplies data about the zoom position of the electronic zoom to the control processor and timing generator 40. The control processor and timing generator 40 controls the zoom and focus motor 5a in connection with the zoom position of the electronic zoom to change the zoom position of the zoom lens 3.

In FIG. 9(B), at a position 910 near a focal length of 40 mm, even when the user sets the zoom button 42c at the "tele" side, the lens is not switched to the zoom lens 3 and the electronic zoom process continues to be executed. Therefore, even when the user finely adjusts the zoom position by alternately operating the zoom button 42c between the "wide" side and the "tele" side near the position 910, the number of switching operations between lenses is reduced.

Figure 17:
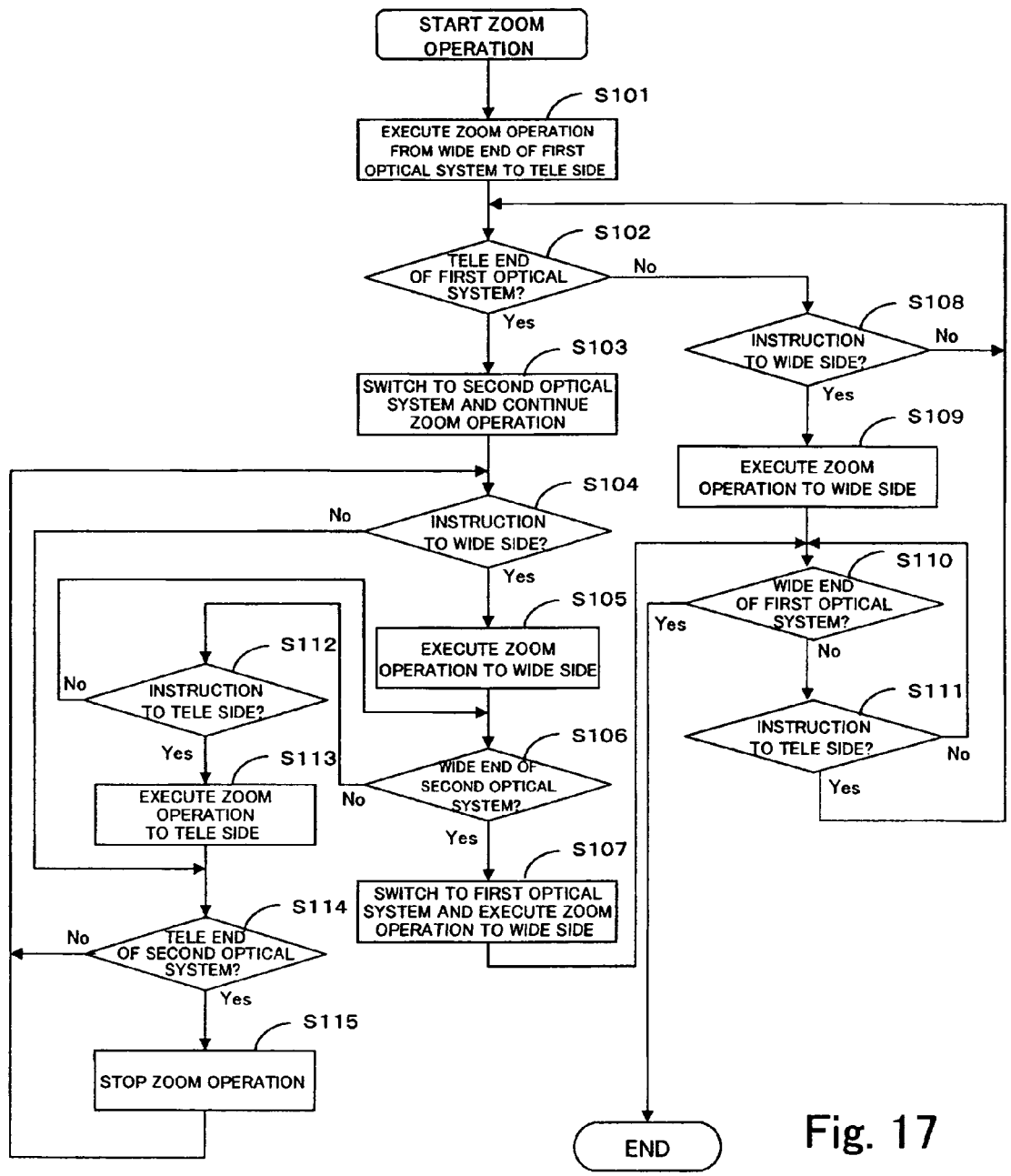
FIG. 17 is a flowchart of a method according to a preferred embodiment of the present invention.

FIG. 17 is a flowchart of the above-described process. When the user sets the zoom button 42c at the "tele" side and starts a zoom operation, a zoom operation from the wide end toward the tele end of the first image-capturing optical system is executed (S101). During the execution of the zoom operation, a determination is made as to whether or not the zoom position reaches the tele end of the first image-capturing optical system (S102).

When the tele end of the first image-capturing optical system has not been reached ("NO" in S102), a determination is made as to whether or not an instruction to zoom to the wide side is issued by an operation of the zoom button 42c (S108). When the instruction to zoom to the wide side is not issued, the process returns to S102 and another determination is made as to whether or not the tele end of the first image-capturing optical system is reached. When, on the other hand, the instruction to zoom to the wide side is issued, a zoom operation toward the wide side is executed (S109). Subsequently, a determination is made as to whether or not the wide end of the first image-capturing optical system is reached during the zoom operation (S110). When the wide end of the first image-capturing optical system is reached, the zoom operation is completed. When the wide end of the first image-capturing optical system has not been reached, a determination is made as to whether or not an instruction to zoom to the tele side is issued by an operation of the zoom button 42c (S111). When the instruction to the tele side is not issued, the process returns to S110 and another determination is made as to whether or not the wide end of the first image-capturing optical system is reached. When, on the other hand, the instruction to zoom to the tele side is issued, the process returns to S102 and a determination is made as to whether or not the tele end of the first image-capturing optical system is reached.

When, on the other hand, the tele end of the first image-capturing optical system is reached ("YES" in S102), the optical system is switched form the first image-capturing optical system to the second image-capturing optical system and zoom operation is continued (S103). Then, a determination is made as to whether or not an instruction to zoom to the wide side is issued by an operation of the zoom button 42c (S104). When the instruction to zoom to the wide side is found to be issued in S104, a zoom operation toward the wide side is executed in the second image-capturing optical system (S105). Then, a determination is made as to whether or not the wide end of the second image capturing optical system is reached during the zoom operation (S106). When the wide end of the second image-capturing optical system is reached, the optical system is again switched from the second image-capturing optical system to the first image-capturing optical system and the zoom operation to the wide side is continued (S107). The processes from S110 as described above are then performed. When the wide end of the second image-capturing optical system is not reached in S106, a determination is made as to whether or not an instruction to zoom toward the tele side is issued by an operation of the zoom button 42c (S112). When the instruction to zoom toward the tele side is not issued, a determination continues to be made as to whether or not the wide end of the second image-capturing optical system is reached. When, on the other hand, the instruction to zoom toward the tele side is issued, a zoom operation toward the tele side is executed in the second image-capturing optical system (S113). During the zoom operation, a determination is made as to whether or not the tele end of the second image-capturing optical system is reached (S114). When the tele end of the second image-capturing optical system is reached, the zoom operation is stopped (S115), and, when the tele end of the second image-capturing optical system has not yet been reached, the processes from S104 are repeated.

When zoom operation toward the wide side is not instructed in S104, the process proceeds to the above-described S114 and the zoom operation is executed until the tele end of the second image-capturing optical system is reached.

Figure 18:
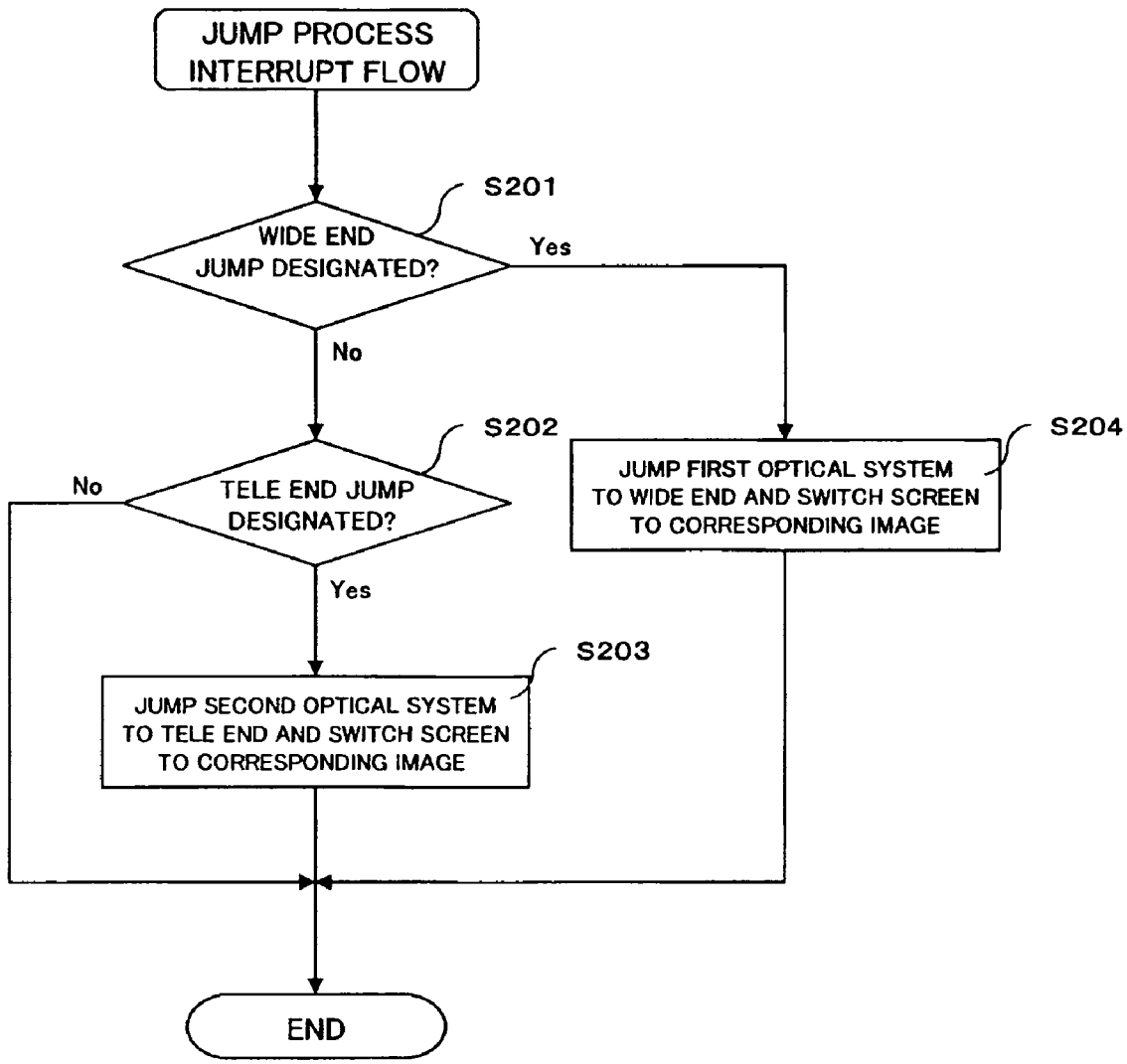
FIG. 18 is a flowchart of an interrupt process in FIG. 17.

FIG. 18 shows a flowchart of an interrupt process in the process flowchart of FIG. 17. This corresponds to a configuration in which the digital camera 10A is provided with a button which forces the zoom position to jump to the wide end of the fixed focal length lens regardless of the current zoom position, or a button which forces the zoom position to jump to the tele end of the zoom lens 3 regardless of the current zoom position. First, a determination is made as to whether or not the user operates the user control 42 to instruct a jump to the wide end (S201). When the jump to the wide end is instructed, the first image-capturing optical system is jumped to the wide end regardless of the current zoom position, and the screen displayed on the LCD 70 is switched to a screen at the wide end of the first image-capturing optical system (S204). When, on the other hand, the jump to the wide end is not designated, a determination is made as to whether or not the user has designated a jump to the tele end by operating the user control 42 (S202). When the jump to the tele end is designated, the second image-capturing optical system is jumped to the tele end regardless of the current zoom position, the screen displayed on the LCD 70 is switched to a screen at the tele end of the second image-capturing optical system (S203).

In the present embodiment, the zoom range 800 of the zoom lens 3 is set at 40 mm-120 mm. The present invention, however, is not limited to such a configuration, and other zoom ranges may be employed.

In the present embodiment, the electronic zoom range 700 of the fixed focal length lens 2 and the optical zoom range 800 of the zoom lens 3 partially overlap each other. Alternatively, the overlap range may be varied according to the image size of the captured image (number of recording pixels).

Figure 10:
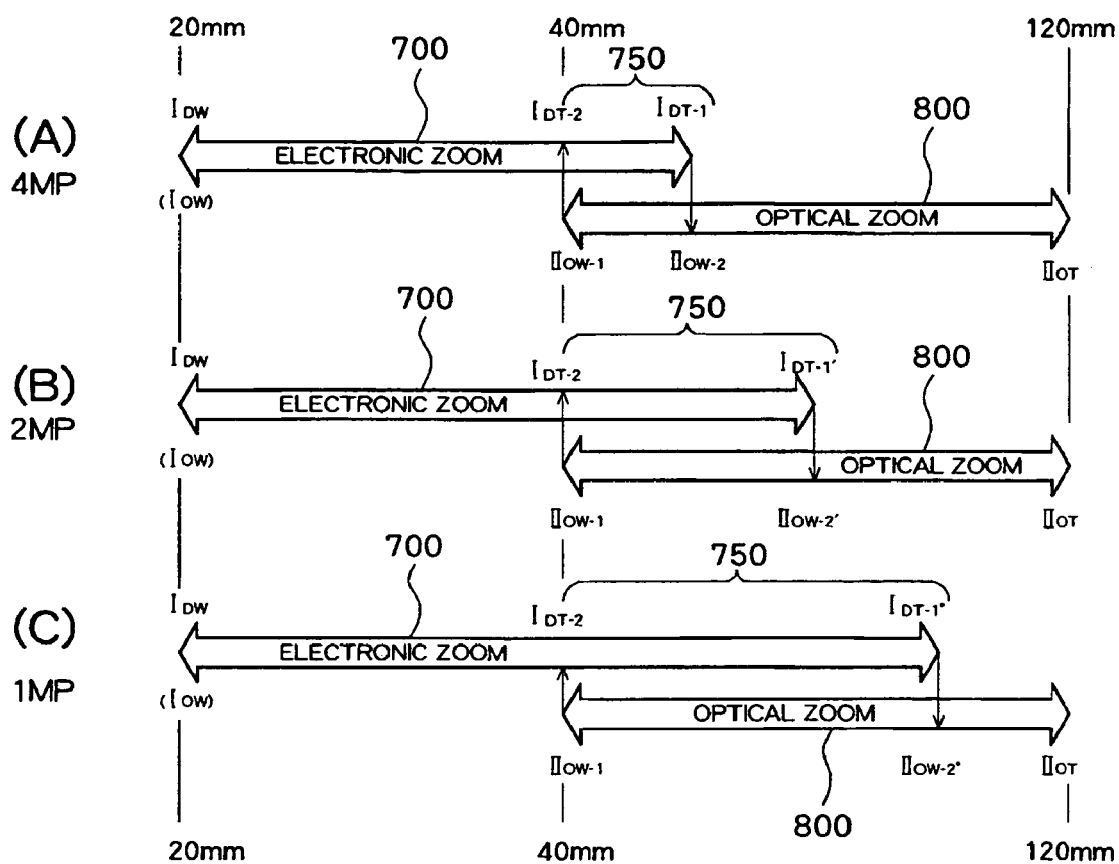
FIG. 10 is a diagram showing an electronic zoom range of a fixed focal length lens corresponding to resolution.

FIG. 10 shows a relationship between the resolution of the captured image and the electronic zoom range 700 of the fixed focal length lens 2 and that between the resolution and the optical zoom range 800 of the zoom lens 3. FIG. 10(A) shows a configuration in which the number of recording pixels is 4 MP, FIG. 10(B) shows a configuration in which the number of recording pixels is 2 MP, and FIG. 10(C) shows a configuration in which the number of recording pixels is 1 MP. The number of recording pixels can be selected by the user operating the user control 42. When the user selects the number of recording pixels by operating the user control 42, the image processor 50 converts the number of pixels of the digital image obtained by the image sensor 12 or 14 and stores the converted image in the memory card 54 in response to the user control 42. The image processor 50 shifts the tele end of the electronic zoom range 700 of the fixed focal length lens 2 toward the tele side as the number of pixels is reduced from 4 MP (4 Mega Pixels) to 2 MP, and 1 MP. With this structure, the overlap range 750 between the electronic zoom range 700 and the optical zoom range 800 is widened toward the tele side. A reason for widening the tele end of the electronic zoom range 700 toward the tele side to extend the overlap range 750 as the number of pixels is reduced is that degradation of the image quality due to expansion of the electronic zoom range becomes less noticeable with a smaller number of pixels.

Figure 11:
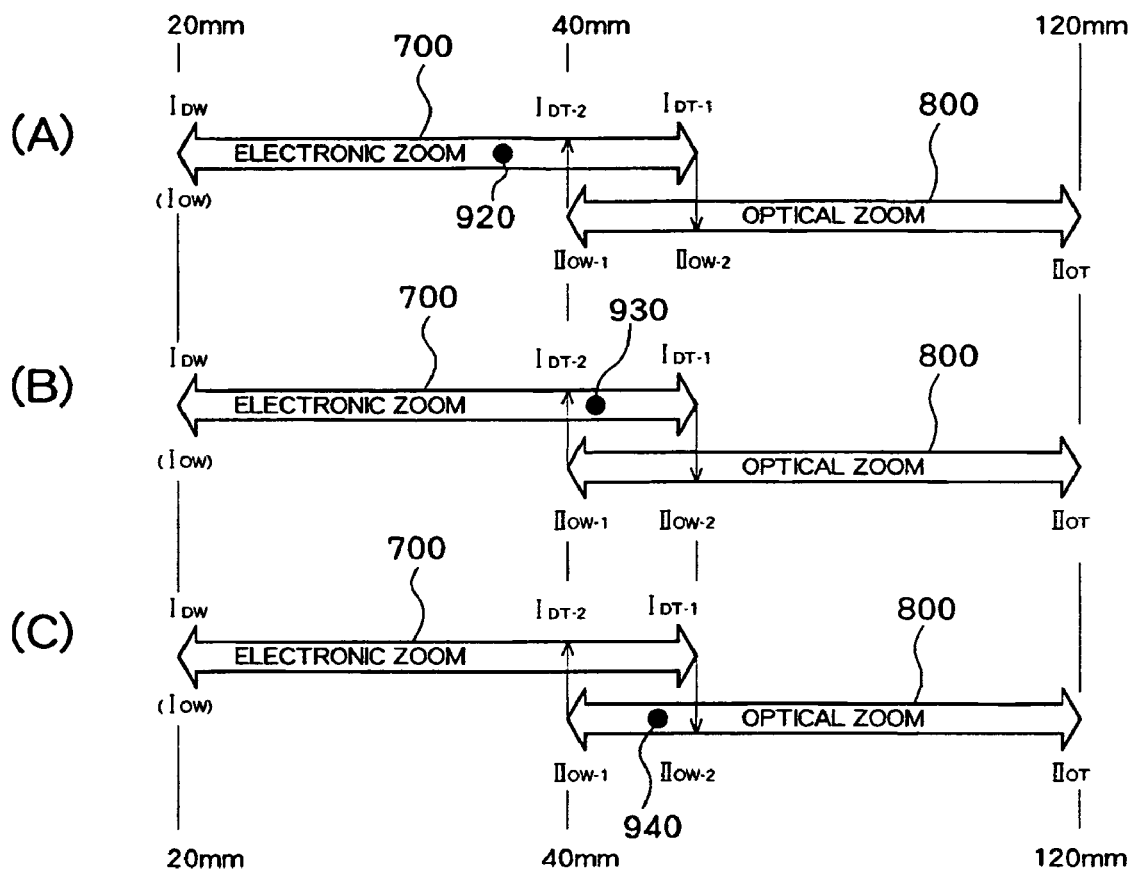
FIG. 11 is a diagram showing a relationship between a zoom position at startup and lens switching.

FIG. 11 shows a relationship between the zoom position at the startup of the digital camera 10A and lens switching. If the digital camera 10A maintains the zoom position when the power is switched off (resume function), when the power of the digital camera is switched on the next time, the corresponding zoom position must be realized by the fixed focal length lens 2 or the zoom lens 3. When the zoom position of the digital camera 10A at startup falls outside the overlap range 750, the determination of which one of the fixed focal length lens 2 and the zoom lens 3 is to be used at startup is automatically made. For example, when the zoom position at startup falls within a range of 20 mm-40 mm, the fixed focal length lens 2 is used. When, on the other hand, the zoom position at startup falls within the overlap range 750, either one of the fixed focal length lens 2 and the zoom lens 3 may be used, and the lens to be used is selected as follows in order to allow reduction of the number of lens switching operations after startup.

FIG. 11 (A) shows a configuration in which the zoom position at startup is at a position 920 within the range of 20 mm-40 mm. In this case, the zoom position 920 is realized by driving the electronic zoom of the fixed focal length lens 2 after startup of the digital camera 10A. That is, the control processor and timing generator 40 determines within which of the electronic zoom range 700, the optical zoom range 800, and the overlap range 750 the zoom position 920 at startup is positioned, and, when the zoom position 920 falls within the electronic zoom range 700, selects the output of the first image sensor 12 and executes electronic zoom. FIGS. 11(B) and 11(C) show a case in which the zoom position at startup is positioned within the overlap range 750. In this case, a distance between the zoom position at startup and the tele end $I_{DT\text{-}1}$ of the electronic zoom range 700 and a distance between the zoom position at startup and the wide end $II_{OW\text{-}1}$ of the optical zoom range 800 are calculated and compared with each other. In other words, a determination is made as to which of the tele end $I_{DT\text{-}1}$ of the electronic zoom range 700 and the wide end $II_{OW\text{-}1}$ of the optical zoom range 800 is closer to the zoom position at startup. FIG. 11(B) shows a case in which a zoom position 930 at startup is closer to the wide end $II_{OW\text{-}1}$, of the optical zoom range 800. In this case, the fixed focal length lens 2 is used at startup. By virtue of using the fixed focal length lens 2, even when the user changes the setting of the zoom position after the startup, such a change can be handled by electronic zoom. If the zoom lens 3 is used at startup and the user sets the zoom position to the wide side after startup, the lens must be switched from the zoom lens 3 to the fixed focal length lens 2. FIG. 11(C) shows a case in which a zoom position 940 at startup is closer to the tele end $I_{DT\text{-}1}$ of the electronic zoom range 700. In this case, the zoom lens 3 is used at startup. By virtue of using the zoom lens 3, even when the user changes the setting of the zoom lens after startup, such a case can be handled by the optical zoom. When the fixed focal length lens 2 is used at startup and the user changes the zoom position to the tele side after startup, the lens must be switched from the fixed focal length lens 2 to the zoom lens 3.

As described, when the zoom position at startup falls within the overlap range 750, the control processor and timing generator 40 calculates the distance L1 between the zoom position at startup and the tele end of the electronic zoom range 700 and the distance L2 between the zoom position at startup and the wide end of the optical zoom range 800 and compares the distances L1 and L2. The fixed focal length lens 2 is used when L1>L2 and the zoom lens 3 is used when L1<L2, in order to reduce the number of switching operations between lenses. When distances L1 and L2 are approximately equal, either lens can be used. In this case, the zoom lens 3 may be used in consideration of image quality.

Figure 12:
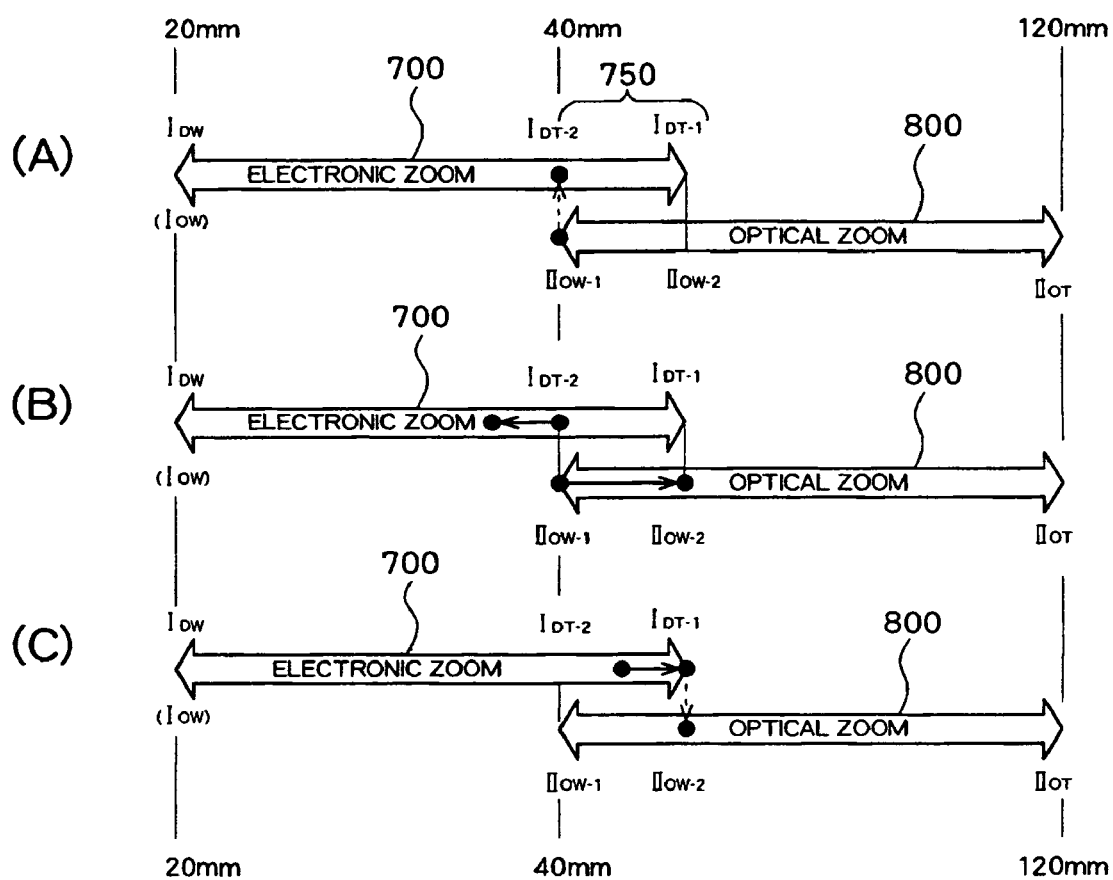
FIG. 12 is a diagram showing a movement state of a zoom lens after lens switching.

FIG. 12 shows a state of the zoom lens 3 when the user operates the zoom button 42c to the "wide" side so that the lens to be used for image capturing is switched from the zoom lens 3 to the fixed focal length lens 2. Because the switching from the zoom lens 3 to the fixed focal length lens 2 is executed at the wide end of the optical zoom range 800; that is, at the minimum focal length $II_{OW\text{-}1}$ of the zoom lens 3 as described above, even after the lens is switched from the zoom lens 3 to the fixed focal length lens 2, the position of the zoom lens 3 may be maintained at the position of switching. However, in the present embodiment, in anticipation of the user operating the zoom button 42c toward the "tele" side in order to switch the lens to be used for image capturing from the fixed focal length lens 2 to the zoom lens 3, the zoom lens 3 is moved to the zoom position $II_{OW\text{-}2}$ in advance.

FIG. 12(A) shows a state of switching from the zoom lens 3 to the fixed focal length lens 2. When the zoom position of the zoom lens 3 reaches $II_{OW\text{-}1}$, the image-capturing lens is switched from the zoom lens 3 to the fixed focal length lens 2. FIG. 12(B) shows movement of the zoom lens 3 when the image-capturing lens is switched to the fixed focal length lens 2. The zoom lens 3 is moved from the zoom position $II_{OW\text{-}1}$, to the zoom position $II_{OW\text{-}2}$. After the image-capturing lens is switched from the zoom lens 3 to the fixed focal length lens 2, the control processor and timing generator 40 controls the zoom and focus motor 5a to move the zoom position of the zoom lens 3 to $II_{OW\text{-}2}$ without switching off the power of the zoom lens 3. During this period, the digital image which is obtained by the fixed focal length lens 2 and the first image sensor 12 and which is electronically zoomed is displayed on the LCD 70 and the digital image which is obtained by the zoom lens 3 and the second image sensor 14 and which is optically zoomed is not displayed on the LCD 70. In this respect, the zoom lens 3 can be said to be driven to the zoom position $II_{OW-2}$ in a background process. FIG. 12(C) shows lens switching when the zoom position of the zoom lens 3 is moved to $II_{OW-2}$ and the user operates the zoom button 42c to the "tele" side in this stand-by state. As described above, the image-capturing lens is switched from the fixed focal length lens 2 to the zoom lens 3 when the electronic zoom range 700 of the fixed focal length lens 2 reaches the tele end $I_{DT-1}$. As shown in FIG. 12(B), because the zoom lens 3 is already moved to the zoom position $II_{OW-2}$ and is in the stand-by state, the time for switching from the fixed focal length lens 2 to the zoom lens 3 can be significantly reduced. In other words, at the lens switching, the zoom lens 3 is not driven to the corresponding zoom position $II_{OW-2}$.

Figure 13:
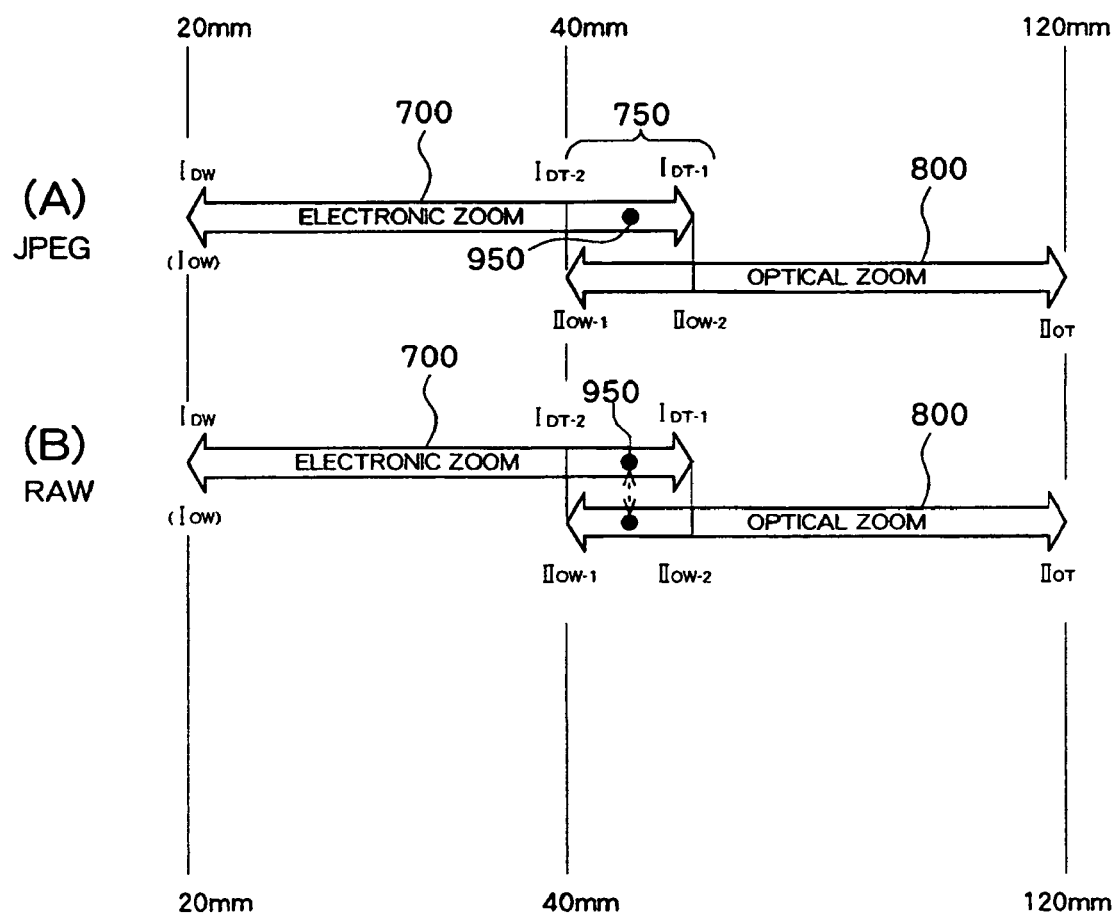
FIG. 13 is a diagram showing lens switching during image capturing of a RAW format image.

FIG. 13 shows a state of lens switching when a JPEG image and a RAW image are captured. FIG. 13(A) shows a case in which the user selects a JPEG image as the data format of the captured image. Even when the user operates the zoom button 42c toward the "tele" side and the zoom position enters the overlap range 750, the electronic zoom is maintained. When the user operates the shutter button 42a at the zoom position, the digital image which is obtained by the fixed focal length lens 2 and the first image sensor 12 and which is electronically zoomed is compressed in JPEG format and stored in the memory card 54. FIG. 13(B) shows a case in which the user selects the RAW data as the data format of the captured image. The expression "RAW data" refers to unprocessed data which is output from the image sensor 12 or 14 and which has not yet been converted to an image format such as JPEG or TIFF. Storing the captured image as RAW image in the memory card 54 is advantageous, in that the format of the captured image can be freely changed according to an electronic device to which the captured image is to be output. In FIG. 13(B), when the zoom position falls within the overlap range 750 and the user operates the shutter button 42a, an electronically zoomed image and an optically zoomed image are obtained at the same angle of view at a position 950 and the two sets of digital image data are stored in the memory card 54 in the RAW format. That is, when the zoom position falls within the overlap range 750 and the image format of the captured image is RAW, two images including the electronically zoomed image obtained by means of the fixed focal length lens 2 and the first image sensor 12 and an optically zoomed image obtained by means of the zoom lens 3 and the second image sensor 14 are simultaneously stored in the memory card 54. In this manner, by storing in the memory card 54 two images captured by two optical systems, two images can be synthesized and output when the RAW format image is to be output. Alternatively, the electronically zoomed image and the optically zoomed image can be obtained at the same angle of view and the images can be stored in the memory card 54 in a case in which the format of the image capturing mode is other than the RAW format.

Figure 14:
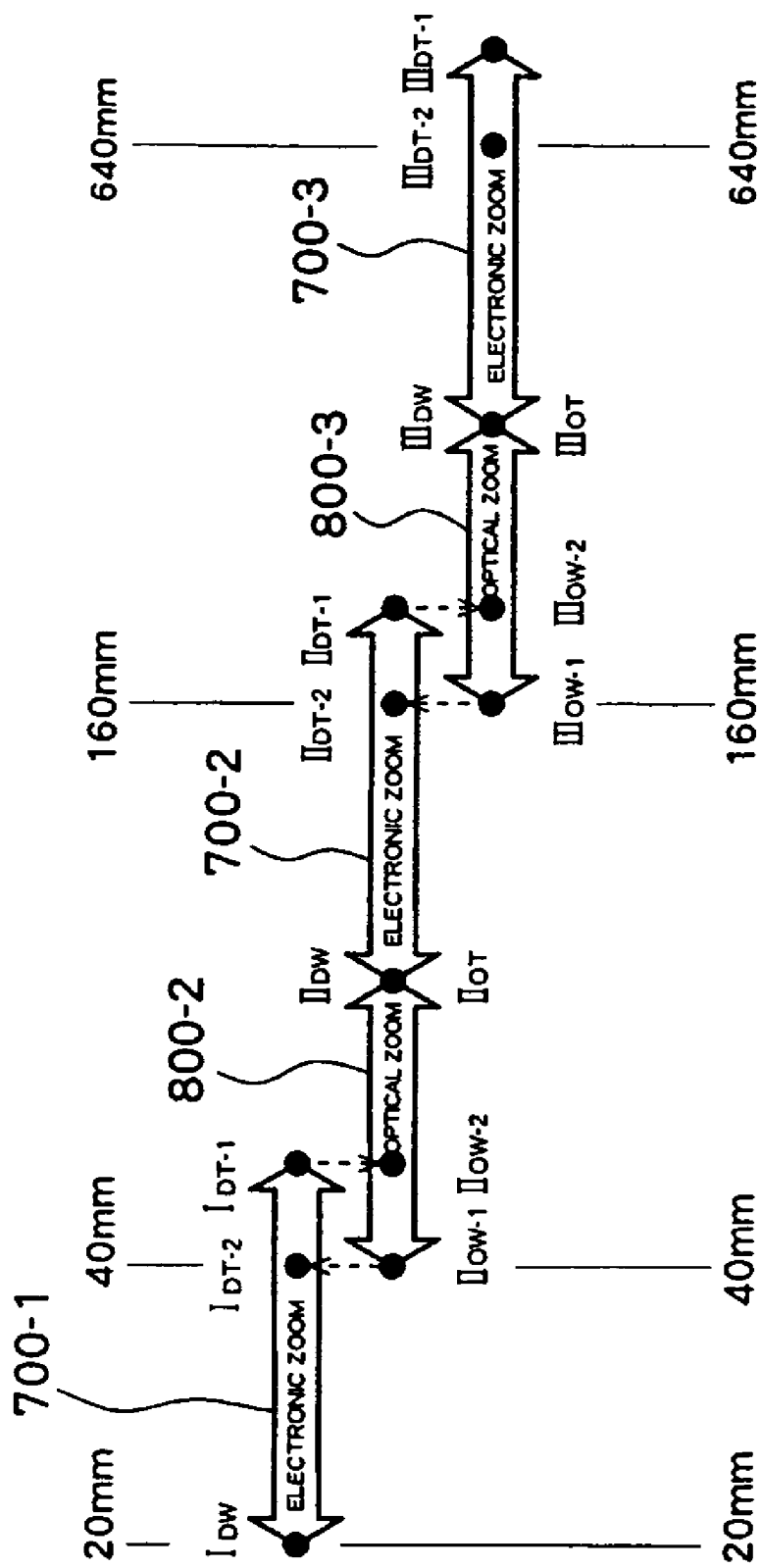
FIG. 14 is a diagram showing a relationship between an electronic zoom and an optical zoom in a digital camera having three image-capturing optical systems.

FIG. 14 shows optical zoom ranges 800-2 and 800-3 of zoom lenses and electronic zoom ranges 700-1, 700-2, and 700-3 when one fixed focal length lens and two zoom lenses are to be provided in the digital camera 10A. This digital camera is a digital camera having three image-capturing optical systems in which a third zoom lens is added to the digital camera 10A having the two image-capturing optical systems shown in FIG. 1. The first lens is a 20 mm fixed focal length lens and has the first electronic zoom range 700-1. The second lens is a 40 mm-80 mm zoom lens and has the second optical zoom range 800-2 and the second electronic zoom range 700-2. The third lens is a 160 mm-320 mm zoom lens and has the third optical zoom range 800-3 and the third electronic zoom range 700-3. The relationship between the first electronic zoom range 700-1 of the first lens and the second optical zoom range of the second lens is identical with the relationship between the electronic zoom range 700 of the fixed focal length lens 2 and the optical zoom range 800 of the zoom lens 3 as described above. The relationship between the second electronic zoom range 700-2 of the second lens and the third optical zoom range 800-3 of the third lens is similar, and the zoom ranges are set so that the ranges partially overlap. That is, the tele end of the second electronic zoom range 700-2 of the second lens is at a position which is closer to the tele side than is the wide end of the third optical zoom range 800-3 of the third lens and closer to the wide side than is the tele end of the third optical zoom range 800-3. The wide end of the second electronic zoom range 700-2 of the second lens is at a position closer to the wide side than is the wide end of the third optical zoom range 800-3 of the third lens. When the camera is transitioned from wide to tele, the lens is switched from the second lens to the third lens at the tele end $II_{DT-1}$ of the second electronic zoom range 700-2. When, on the other hand, the camera is transitioned from tele to wide, the lens is switched from the third lens to the second lens at the wide end $III_{OW}$ of the third optical zoom range 800-3.

A preferred embodiment of the present invention has been described. However, the present invention, is not limited to the above-described configuration, and modifications may be made.

For example, even when the zoom lens 3 is still in a preparation state during startup of the digital camera 10A and no digital image can be obtained from the second image sensor 14, quick startup of the digital camera 10A can be realized by obtaining the image by means of only the electronic zoom of the fixed focal length lens 2.

When the zoom lens 3 is still in the preparation state, a digital image can be obtained by enlarging the electronic zoom range of the fixed focal length lens 2 despite such a configuration causing degradation in image quality. In other words, in FIG. 8, the digital image can be obtained by extending the tele end of the electronic zoom range 700 to 120 mm during startup of the digital camera 10A.

When the user inputs rapid zoom by means of the user control 42, the electronic zoom can be executed and the optical zoom can be skipped. In the structure of FIG. 14, this process proceeds as follows. When the user inputs rapid zoom by means of the user control 42, the control processor and timing generator 40 discretely and electronically zooms in the electronic zoom range 700-1 and switches not from the electronic zoom of the first lens to the optical zoom of the second lens, but from the electronic zoom of the first lens to the electronic zoom of the second lens when the lens is switched from the first lens to the second lens. That is, the zoom position is not transitioned from the zoom position $I_{DT-1}$ to the zoom position $II_{OW-2}$, but is transitioned from the zoom position $I_{DT-1}$ to the zoom position $II_{DW}$. When the lens is switched from the second lens to the third lens, the zoom is not switched from the electronic zoom of the second lens to the optical zoom of the third lens, but is switched from the electronic zoom of the second lens to the electronic zoom of the third lens. That is, the zoom position is not transitioned from the zoom position $II_{DT-1}$ to the zoom position $III_{OW-2}$, but is transitioned from the zoom position $II_{DT-1}$ to the zoom position $III_{DW}$. In this manner, by virtue of discretely moving the zoom position of the electronic zoom and skipping the optical zoom of the zoom lens, a rapid zoom process can be achieved. A similar process can be applied during zoom-out.

It is also possible to loop the zoom position when the user continues to operate on the zoom button 42c. For example, in the example configuration of FIG. 14, when the user continues to set the zoom button 42c to the "tele" side, the zoom position moves continuously or discretely from the wide end $I_{DW}$ of the fixed focal length lens to the tele end $III_{DT-2}$ of the electronic zoom of the third lens. Then, the zoom position jumps directly from the tele end $III_{DT-2}$ to the wide end $I_{DW}$. In this manner, the zoom position loops from $I_{DW}$ to $III_{DT-1}$ back to $I_{DW}$.

In the digital camera having three image-capturing optical systems as shown in FIG. 14, the optical zoom range 800-2 of the second lens and the optical zoom range 800-3 of the third lens can be set to partially overlap each other.

Alternatively, the digital camera can be configured so that an arbitrary image other than the captured image is displayed on the LCD 70 when the lens is switched from the fixed focal length lens 2 to the zoom lens 3 or when the lens is switched from the zoom lens 3 to the fixed focal length lens 2. If a certain amount of time is required to display the image obtained by the zoom lens 3 and the second image sensor 14 on the LCD 70 during switching from the fixed focal length lens 2 to the zoom lens 3, no image is displayed on the LCD 70 during this time. Therefore, an arbitrary image is preferably displayed on the LCD 70 so that the user does not feel inconvenient in relation to the lens switching. As the image displayed on the LCD 70 during lens switching, for example, there is preferably displayed an image of a curtain closing from top and bottom of the LCD 70, and an image of the curtain opening toward the top and bottom of the LCD 70 after the screen of the LCD 70 is covered by the curtain (so-called "wipe image") so as to give the user some sense of a game. By displaying such an image, the user can recognize that lens switching is being executed in the digital camera 10A and, at the same time, does not feel uncomfortable about the wait time associated with the switching process.

Figure 19:
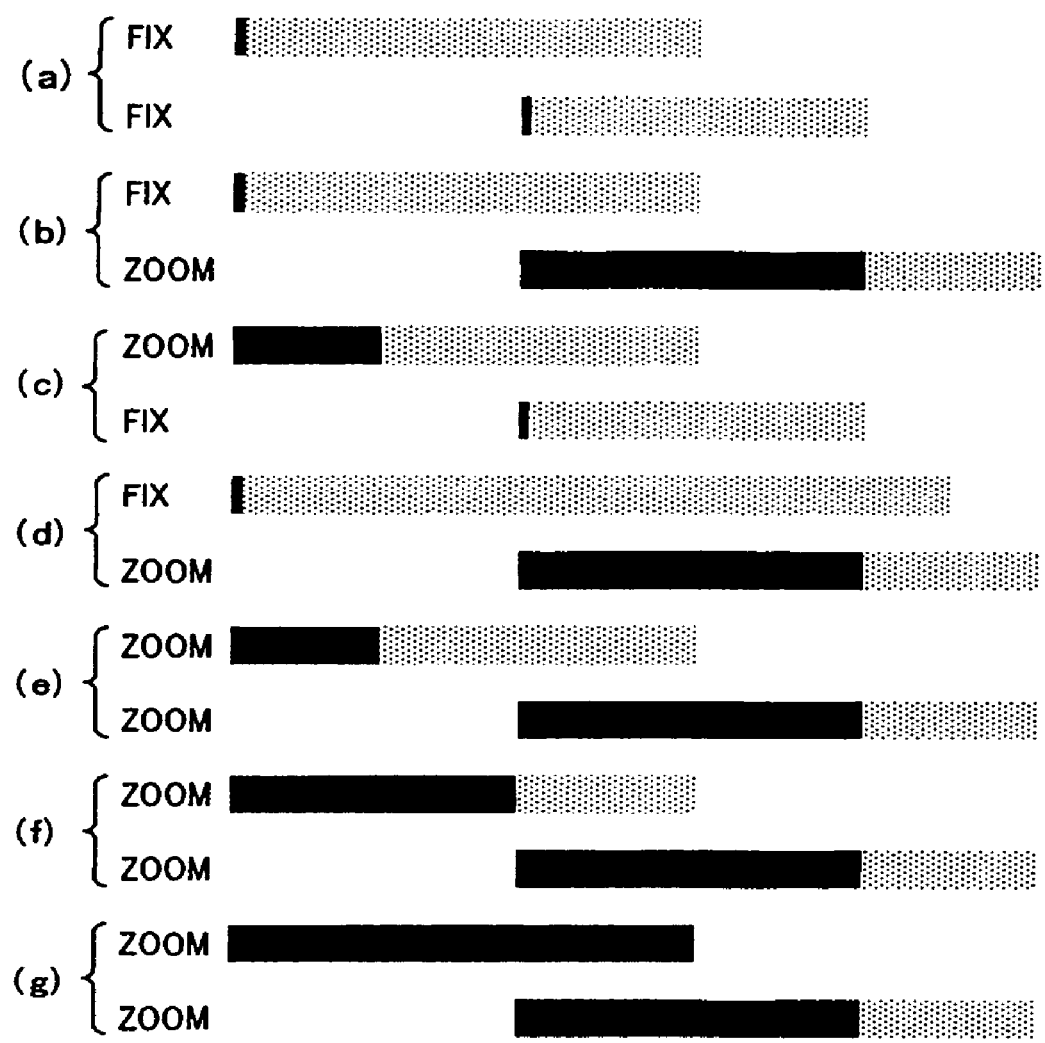
FIG. 19 is a diagram for explaining a zoom range pattern of two optical systems.
Figure 20:
FIG. 20 is a diagram for explaining a zoom range pattern of three optical systems.

FIGS. 19 and 20 show patterns of the optical zoom ranges and electronic zoom ranges of multiple optical systems. FIG. 19 shows a configuration with two image-capturing optical systems, and FIG. 20 shows a configuration with three image-capturing optical systems.

FIG. 19(a) shows a configuration in which both the first image-capturing optical system and the second image-capturing optical system have fixed focal length lenses (FIX). The focal lengths of the two fixed focal length lenses differ from each other, and the focal length gap (a gap between the focal lengths) is interpolated by electronic zoom of the first image-capturing optical system.

FIG. 19(b) shows a configuration in which the first image-capturing optical system has a fixed focal length lens (FIX) and the second image capturing optical system has a zoom lens (ZOOM). The focal length of the fixed focal length lens is shorter than the focal length of the zoom lens, and the focal length gap is interpolated by the electronic zoom of the first image-capturing optical system. The electronic zoom range of the first image-capturing optical system and the optical zoom range of the second image-capturing optical system partially overlap.

FIG. 19(c) shows a configuration in which the first image-capturing optical system has a zoom lens and the second image-capturing optical system has a fixed focal length lens. The focal length of the zoom lens is shorter than the focal length of the fixed focal length lens, and the focal length gap is interpolated by the electronic zoom of the first image-capturing optical system. The electronic zoom range of the first image-capturing optical system and the electronic zoom range of the second image-capturing optical system partially overlap.

FIG. 19(d) shows a configuration in which the first image-capturing optical system has a fixed focal length lens and the second image-capturing optical system has a zoom lens. A difference from the configuration of FIG. 19(b) lies in that the tele end of the electronic zoom of the first image-capturing optical system extends beyond the tele end of the optical zoom of the second image-capturing optical system into the electronic zoom range of the second image-capturing optical system.

FIG. 19(e) shows a configuration in which the first image-capturing optical system and the second image-capturing optical system both have zoom lenses. The focal length of the zoom lens of the first image-capturing optical system is shorter than the focal length of the zoom lens of the second image-capturing optical system, and the focal length gap is interpolated by the electronic zoom of the first image-capturing optical system. The tele end of the electronic zoom of the first image-capturing optical system extends into the optical zoom range of the second image-capturing optical system.

FIG. 19(f) shows a configuration in which the first image-capturing optical system and the second image-capturing optical system both have zoom lenses similar to the configuration of FIG. 19(e). A difference from the configuration of FIG. 19(e) lies in that the tele end of the optical zoom of the first image-capturing optical system coincides with the wide end of the optical zoom of the second image-capturing optical system and there is no focal length gap.

FIG. 19(g) shows a configuration in which the first image-capturing optical system and the second image-capturing optical system both have zoom lenses similar to the configurations of FIGS. 19(e) and 19(f). A difference from the configuration of FIG. 19(f) lies that the tele end of the optical zoom of the first image-capturing optical system extends into the optical zoom range of the second image-capturing optical system.

FIG. 20(a) shows a configuration in which the first image-capturing optical system, the second image-capturing optical system, and the third image-capturing optical system have fixed focal length lenses (FIX). The three fixed focal length lenses have different focal lengths, and the focal length gap between the first image-capturing optical system and the second image-capturing system is interpolated by the electronic zoom of the first image-capturing optical system, and the focal length gap between the second image-capturing optical system and the third image-capturing optical system is interpolated by the electronic zoom of the second image-capturing optical system.

FIG. 20(b) shows a configuration in which the first image-capturing optical system and the third image-capturing optical system have fixed focal length lenses and the second image-capturing optical system has a zoom lens (ZOOM). The three image-capturing optical systems differ in focal length and, consequently, there are focal length gaps. The tele end of the electronic zoom of the first image-capturing optical system extends into the optical zoom range of the second image-capturing optical system, and the tele end of the electronic zoom of the second image-capturing optical system extends into the electronic zoom range of the third image-capturing optical system.

FIG. 20(c) shows a configuration in which the first image-capturing optical system has a fixed focal length lens and the second image-capturing optical system and the third image-capturing optical system have zoom lenses. The three image-capturing optical systems differ in focal length and, consequently, there are focal length gaps. The tele end of the electronic zoom of the first image-capturing optical system extends into the optical zoom range of the second image-capturing optical system, and the tele end of the electronic zoom of the second image-capturing optical system extends into the optical zoom range of the third image-capturing optical system.

FIG. 20(*d*) shows a configuration in which the first image-capturing optical system has a fixed focal length lens and the second image-capturing optical system and the third image-capturing optical system have zoom lenses similar to the configuration of FIG. 20(*c*). A difference from the configuration of FIG. 20(*c*) lies in that there is no focal length gap between the second image-capturing optical system and the third image-capturing optical system, and the tele end of the optical zoom of the second image-capturing optical system extends into the optical zoom range of the third image-capturing optical system.

The switching timing between the image-capturing optical systems in the embodiment can be applied to any of these combinations. For example, referring to FIG. 19(*f*), when the user performs a zoom-in operation, the zoom is switched from the electronic zoom of the first image-capturing optical system to the optical zoom of the second image-capturing optical system at the tele end of the electronic zoom of the first image-capturing optical system and, when the user performs a zoom-out operation, the zoom is switched from the optical zoom of the second image-capturing optical system to the optical zoom of the first image-capturing optical system at the wide end of the optical zoom of the second image-capturing optical system. Referring to FIG. 19(*g*), when the user performs a zoom-in operation, the zoom is switched from the optical zoom of the first image-capturing optical system to the optical zoom of the second image-capturing optical system at the tele end of the optical zoom of the first image-capturing optical system and, when the user performs a zoom-out operation, the zoom is switched from the optical zoom of the second image-capturing optical system to the optical zoom of the first image-capturing optical system at the wide end of the optical zoom of the second image-capturing optical system. It should be noted that in any of these patterns, the switching timing or the switching zoom position during zoom-in and the switching timing or the switching zoom position during zoom-out differ from each other.

What is claimed is:

1. An image-capturing device having multiple optical systems, the image-capturing device comprising:
    an image-capturing optical system having a first image-capturing optical system which is of a zoom type and a second image-capturing optical system which is of a zoom type, wherein an angle of view at a wide end of a zoom range of the first image-capturing optical system is set to be wider than an angle of view at a wide end of a zoom range of the second image-capturing optical system and the zoom ranges are set so that a portion of the zoom range of the first image-capturing optical system overlaps a portion of the zoom range of the second image-capturing optical system;
    a user setting unit which sets an angle of view for image capturing to an angle of view desired by a user; and
    a controller which applies a control to switch to the second image-capturing optical system at a tele end or a position near the tele end of the first image-capturing optical system when the first image-capturing optical system is used to zoom in and to switch to the first image-capturing optical system at a wide end or a position near the wide end of the second image-capturing optical system when the second image-capturing optical system is used to zoom out, the controller further controls a switching point between the first image-capturing system and the second image-capturing system when a captured image is transitioned from wide to tele that is not identical and differs from the switching point between the first image-capturing system and the second image-capturing system when the captured image is transitioned from tele to wide.

2. An image-capturing device according to claim 1, wherein
    the first image-capturing optical system has an electronic zoom at least in the overlap range of angle of view, and
    the image-capturing device further comprises:
    a pixel number setting unit which can set a number of recording pixels of an image-capturing element in at least two stages, and
    a unit which changes a position of a tele end of the electronic zoom of the first image-capturing optical system according to a set number of recording pixels.

3. An image-capturing device according to claim 2, further comprising:
    an electronic zoom range setting unit which sets the tele end of the electronic zoom range further to the tele side as the set number of recording pixels becomes smaller.

4. An image-capturing device according to claim 1, further comprising:
    a unit which calculates a first distance from the set angle of view to the tele end of the zoom range of the first image-capturing optical system and a second distance from the set angle of view to the wide end of the second image-capturing optical system when the set angle of view falls within the overlap range, and
    a unit which switches zoom to the zoom of the second image-capturing optical system when the first distance is smaller than the second distance and to the zoom of the first image-capturing optical system when the first distance is greater than the second distance.

5. An image-capturing device according to claim 1, further comprising:
    a unit which sets movement of a zoom position of the second image-capturing optical system to a position corresponding to the tele end of the zoom range of the first image-capturing optical system in connection with the switching from the zoom of the second image-capturing optical system to the zoom of the first image-capturing optical system.

6. An image-capturing device according to claim 1, further comprising:
    a storing unit which stores image data obtained by the first image-capturing optical system and image data obtained by the second image-capturing optical system when the set angle of view falls within the overlap range.

7. An image-capturing device according to claim 6, further comprising:
    a unit which sets a captured image mode, wherein
    the storing unit stores the image data obtained by the first image-capturing optical system and the image data obtained by the second image-capturing optical system when the set captured image mode is a RAW format.

8. An image-capturing device having multiple optical systems, comprising:
    a first image-capturing optical system and
    a second image-capturing optical system, wherein
    the first image-capturing optical system has a first electronic zoom range;
    the second image-capturing optical system has a second optical zoom range and a second electronic zoom range;
    the first electronic zoom range and the second optical zoom range are set so that the first electronic zoom range partially overlaps the second optical zoom range; and the image-capturing device further comprises a user operating unit which sets the angle of view for image capturing to an angle of view desired by a user, and a control unit which applies a control according to an angle of view which is set by the user operating unit to switch to an optical zoom of the second image-capturing optical system at a tele end or a position near the tele end of the first electronic zoom range when the first image-capturing optical system is used to zoom in and to an electronic zoom of the first image-capturing optical system at a wide end of the second optical zoom range when the second image-capturing optical system is used to zoom out, the controller further controls a switching point between the first image-capturing system and the second image-capturing system when a captured image is transitioned from wide to tele that is not identical and differs from the switching point between the first image-capturing system and the second image-capturing system when the captured image is transitioned from tele to wide.

9. An image-capturing device according to claim 8, wherein the control unit applies a control to switch from the electronic zoom of the first image-capturing optical system to an electronic zoom of the second image-capturing optical system at the tele end or near the tele end of the first electronic zoom range when a rapid zoom-in is set by the user operating unit and to switch from the electronic zoom of the second image-capturing optical system to the electronic zoom of the first image-capturing optical system at a wide end or near the wide end of the second electronic zoom range when a rapid zoom-out is set by the user operating unit.

10. An image-capturing device having multiple optical systems, comprising:

a first image-capturing optical system, and a second image-capturing optical system, wherein the first image-capturing optical system has a first optical zoom range and a first electronic zoom range;

the second image-capturing optical system has a second optical zoom range and a second electronic zoom range;

the first electronic zoom range and the second optical zoom range of the second image-capturing optical system are set so that the first electronic zoom range and a portion of the second optical zoom range partially overlap as a result of a tele end of the first electronic zoom range being set to be at a wider side than a tele end of the second optical zoom range and a wide end of the first electronic zoom range to be at a wide end of the second optical zoom range, and the image-capturing device further comprises:

a user operating unit which sets an angle of view for image capturing to an angle of view desired by a user, and a control unit which applies a control according to an angle of view which is set by the user operating unit to switch to an optical zoom of the second image-capturing optical system at the tele end of the first electronic zoom range when the first image-capturing optical system is used to zoom in and to an optical zoom of the first image-capturing optical system at the wide end of the second optical zoom range when the second image-capturing optical system is used to zoom out, the controller further controls a switching point between the first image-capturing system and the second image-capturing system when a captured image is transitioned from wide to tele that is not identical and differs from the switching point between the first image-capturing system and the second image-capturing system when the captured image is transitioned from tele to wide.

11. An image-capturing device having multiple image-capturing optical systems, comprising:

a first image-capturing optical system, and a second image-capturing optical system, wherein the first image-capturing optical system has a first optical zoom range and a first electronic zoom range;

the second image-capturing optical system has a second optical zoom range and a second electronic zoom range;

the first optical zoom range of the first image-capturing optical system and the second optical zoom range of the second image-capturing optical system are set so that the first optical zoom range and the second optical zoom range partially overlap as a result of a tele end of the first optical zoom range being set to be at a wider side than a tele end of the second optical zoom range and at a position nearer to the tele side than is a wide end of the second optical zoom range of the second image-capturing optical system, and the image-capturing device further comprises:

a user operating unit which sets an angle of view for image capturing to an angle of view desired by a user, and a control unit which applies a control according to an angle of view which is set by the user operating unit to switch to an optical zoom of the second image-capturing optical system at the tele end of the first optical zoom range when the first image-capturing optical system is used to zoom in and to an optical zoom of the first image-capturing optical system at the wide end of the second optical zoom range when the second image-capturing optical system is used to zoom out, the controller further controls a switching point between the first image-capturing system and the second image-capturing system when a captured image is transitioned from wide to tele that is not identical and differs from the switching point between the first image-capturing system and the second image-capturing system when the captured image is transitioned from tele to wide.

* * * * *